US008988247B1

(12) United States Patent
Lee et al.

(10) Patent No.: US 8,988,247 B1
(45) Date of Patent: Mar. 24, 2015

(54) MOBILE TERMINAL AND METHOD OF CONTROLLING THE SAME

(71) Applicant: LG Electronics Inc., Seoul (KR)

(72) Inventors: Younkyung Lee, Seoul (KR); Yongwoo Kim, Seoul (KR); Hyunju Kim, Seoul (KR); Jungmin Park, Seoul (KR); Joohyeon Oh, Seoul (KR); Junsoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/244,443

(22) Filed: Apr. 3, 2014

(30) Foreign Application Priority Data

Sep. 2, 2013 (KR) .................. 10-2013-0105033

(51) Int. Cl.
*G08B 5/00* (2006.01)
*G08C 19/16* (2006.01)
*G05B 19/02* (2006.01)
*F25B 49/00* (2006.01)
*G05D 23/00* (2006.01)
*F22B 37/00* (2006.01)
*G08C 17/02* (2006.01)
*H04M 1/02* (2006.01)

(52) U.S. Cl.
CPC ............ *G08C 17/02* (2013.01); *H04M 1/0264* (2013.01)
USPC .................. 340/815.6; 340/12.5; 340/12.22; 340/4.32; 62/125; 62/126; 62/131; 62/158; 165/244; 165/253; 165/11.2; 165/259

(58) Field of Classification Search
USPC .............. 340/426.36, 815.6, 12.22, 4.3, 10.2, 340/12.5, 4.32; 62/125, 126, 131, 158; 165/244, 253, 11.2, 259
See application file for complete search history.

(56) References Cited

U.S. PATENT DOCUMENTS

| 4,502,290 | A | * | 3/1985 | Suzuki et al. .................. 62/229 |
| 6,285,357 | B1 | * | 9/2001 | Kushiro et al. ............... 345/169 |
| 2006/0144055 | A1 | * | 7/2006 | Ahn ................................ 62/126 |
| 2007/0015579 | A1 | * | 1/2007 | Masaki et al. .................. 463/37 |
| 2007/0229671 | A1 | * | 10/2007 | Takeshita et al. .......... 348/211.2 |
| 2010/0121492 | A1 | * | 5/2010 | Horiuchi et al. .............. 700/275 |
| 2010/0286801 | A1 | | 11/2010 | Yum et al. |
| 2010/0304787 | A1 | | 12/2010 | Lee et al. |
| 2012/0195460 | A1 | | 8/2012 | Inigo |
| 2012/0274662 | A1 | * | 11/2012 | Kim et al. ...................... 345/650 |
| 2012/0318010 | A1 | * | 12/2012 | Matsumoto et al. ............ 62/126 |
| 2013/0083193 | A1 | * | 4/2013 | Okuyama et al. ............. 348/143 |
| 2013/0198176 | A1 | | 8/2013 | Kim |
| 2013/0222672 | A1 | | 8/2013 | Kim et al. |
| 2014/0055251 | A1 | * | 2/2014 | Son et al. .................... 340/12.54 |

* cited by examiner

*Primary Examiner* — Fekadeselassie Girma
(74) *Attorney, Agent, or Firm* — Birch, Stewart, Kolasch & Birch, LLP

(57) ABSTRACT

Provided is a mobile terminal including a wireless communication unit that is configured to communicate with an air conditioner, a camera that captures an image of at least one photographic subject, a display unit to which the image that includes at least one graphic object corresponding to the at least one photographic subject, respectively, is output, and a controller that, if the at least one photographic subject is the air conditioner, outputs state information on the air conditioner, which includes operation information relating to a wind that is output from the air conditioner, to the vicinity of the graphic object corresponding to the air conditioner.

24 Claims, 23 Drawing Sheets

(a)

(b)

(a)

(b)

(a)

(b)

(a)

(b)

(a)

(b)

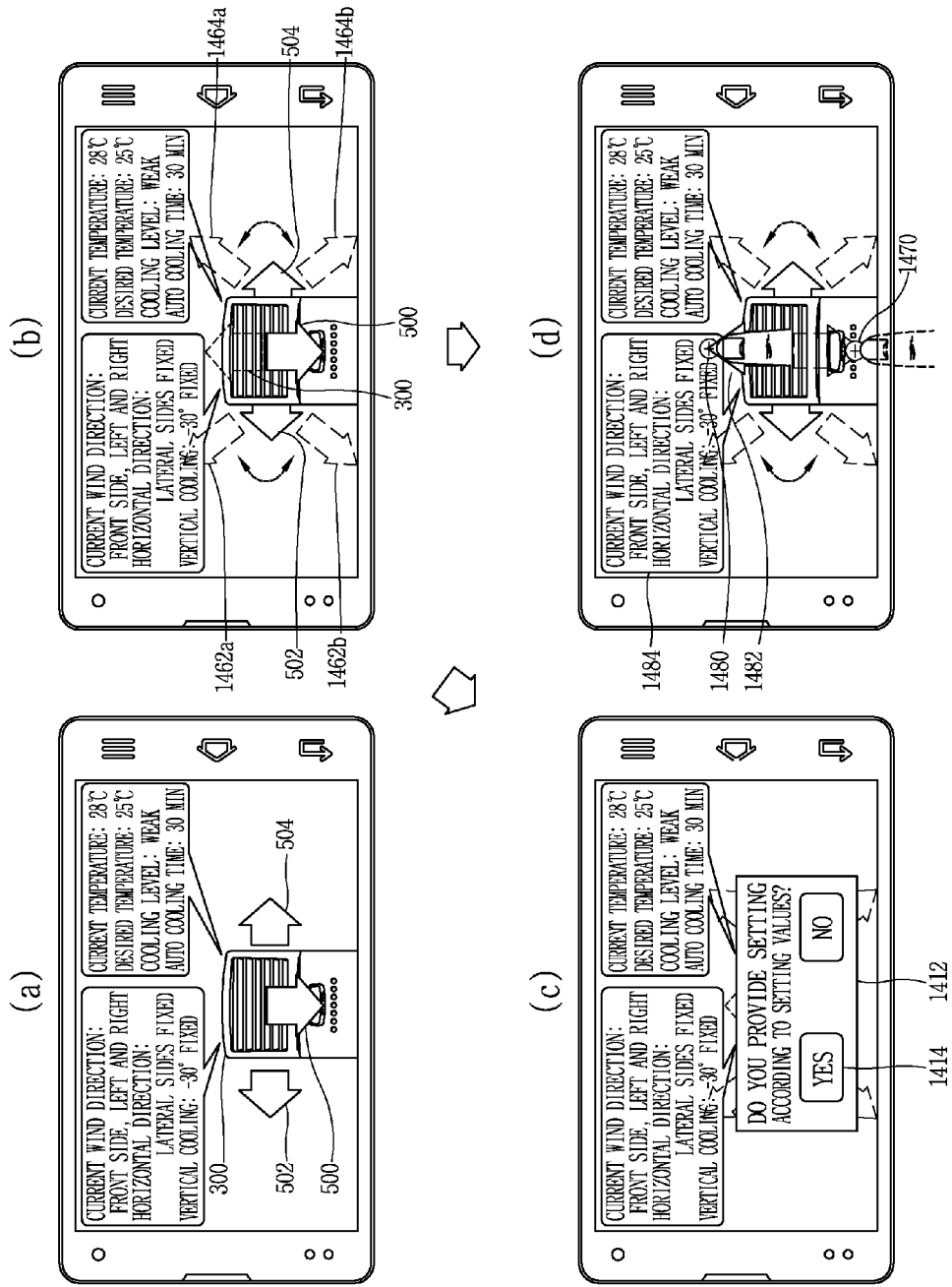

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2013-0105033, filed on Sep. 2, 2013, the contents of which is incorporated by reference herein in its entirety.

BACKGROUND OF THE DISCLOSURE

1. Field of the Disclosure

The present disclosure relates to a mobile terminal capable of performing augmented reality display and a method of controlling the mobile terminal.

2. Background of the Disclosure

A current mobile terminal has evolved into a multimedia device equipped with various functions such as photograph shooting and moving image shooting. The current mobile terminal has been developed to such an extent that it is capable of realizing augmented reality and various methods of using the augmented reality (AR) are under development.

SUMMARY OF THE DISCLOSURE

Therefore, an aspect of the detailed description is to provide a mobile terminal capable of controlling various home appliances using augmented reality and a method of controlling the mobile terminal.

To achieve these and other advantages and in accordance with the purpose of this specification, as embodied and broadly described herein, there is provided a mobile terminal including a wireless communication unit that is configured to communicate with an air conditioner, a camera that captures an image of at least one photographic subject, a display unit to which the image that includes at least one graphic object corresponding to the at least one photographic subject, respectively, is output, and a controller that, if the at least one photographic subject is the air conditioner, outputs state information on the air conditioner, which includes operation information relating to a wind that is output from the air conditioner, to the vicinity of the graphic object corresponding to the air conditioner.

In the mobile terminal, corresponding to a touch that is applied to a region to which the state information is output, the controller may control the wireless communication unit in such a manner that a control signal for controlling the air conditioner is transmitted to the air conditioner.

In the mobile terminal, based on at least one touch, among the different-type touches that are applied to the region to which the state information is output, and based on the extent to which the at least one touch is applied to the region, the controller may transmit to the air conditioner the different control signals for controlling the air conditioner.

In the mobile terminal, the state information may include an image object indicating the operation information relating to a force of the wind that is output from the air conditioner, the controller may generate the control signal for controlling the force of the wind if a pinch-in or pinch-out type touch is applied to the image object, and the extent to which the force of the wind is controlled may differ according to the extent to which the pinch-in or pinch-out touch may be applied to the image object.

In the mobile terminal, based on at least one, among a touch distance and direction of a drag touch that is applied to the region to which the state information is output, the controller may generate the control signal for changing a direction of the wind that is output from the air conditioner or changing a distance that the wind blows.

In the mobile terminal, the controller may calculate relative locations of the mobile terminal and the air conditioner and may transmit to the air conditioner the control signal relating to the wind of the air conditioner according to the calculated locations.

In the mobile terminal, the relative locations may be calculated through at least one, among a state of wireless communication between the air conditioner and the mobile terminal, an incident angle at which one of the air conditioner and the mobile terminal receives an image of the other and a distance between the air conditioner and the mobile terminal, and a position of the mobile terminal with respect to the position of the air conditioner in an imaginary coordinate system.

In the mobile terminal, the operation information may include an image corresponding to a wind that is output from the air conditioner, the graphic object corresponding to the air conditioner may be output to the display unit, and among the graphic objects corresponding to the air conditioner, the controller may output the image object to the vicinity of a region corresponding to a position to which the wind is actually output from the air conditioner.

In the mobile terminal, the image corresponding to the wind that is output from the air conditioner may be at least one, among a stationary image and a dynamic image.

In the mobile terminal, based on the operation information, the image corresponding to the wind that is output from the air conditioner may be configured to take at least one, among a specific shape, an appearance and a color, In the mobile terminal, the operation information may include a direction of the wind, a force of the wind, a distance that the wind blows, and a temperature of the wind, the direction of the wind may be indicated by an arrow image that differs according to the direction of the wind, the arrow image may differ in thickness according to the force of the wind, the arrow image may differ in length according to the distance that the wind blows, and the arrow image may differ in color according to the temperature of the wind.

In the mobile terminal, among the pieces of state information, the controller may output the state information other than the operation information to at least one region of the display unit through a text, an image, and a moving image.

In the mobile terminal, among the pieces of state information, the state information other than the operation information may be output on a region of the graphic object corresponding to the air conditioner, the region which corresponds to a region of the air conditioner, in which a display unit is actually arranged.

In the mobile terminal, based on a user selection, the controller may control the wireless communication unit in such a manner that an optimal-state control signal for controlling at least one operation state of the air conditioner, which enables the air conditioner to operate in an optimal state, is transmitted.

In the mobile terminal, based on an optimal-state setting information already stored in a storage unit, the controller may transmit to the air conditioner the optimal-state control signal that enables the air conditioner to operate in the optimal state.

In the mobile terminal, if a current state information on the air conditioner is different from the already-stored optimal-state setting information, the controller may output alarm information that the optimal-state setting information is present.

In the mobile terminal, the optimal-state setting information includes at least one setting value relating to the operation state of the air conditioner, which is previously set in the air conditioner.

To achieve these and other advantages and in accordance with the purpose of this specification, as embodied and broadly described herein, there is provided a mobile terminal including a wireless communication unit that is configured to communicate with an air conditioner, a camera that captures an image of a photographic subject that falls within a range of a viewing angle, a display unit to which at least one graphic object corresponding to the photographic subject that is positioned within the range of the viewing angle of the camera is output, and a controller that, when a wind that is output from the air conditioner reaches the photographic subjects, outputs state information on the air conditioner, which includes operation information relating to the wind that is output, to the vicinity of the at least one graphic object, in which although the air conditioner does not fall within the range of the viewing angle of the camera, the controller outputs the state information to the vicinity of the at least one graphic object.

In the mobile terminal, the controller may display visual information corresponding to the state information on the air conditioner that is received from the air conditioner, on at least one region of the display unit.

In the mobile terminal, corresponding to a touch input that is applied to one piece of information, among the pieces of operation information, the controller may transmit to the air conditioner a control signal for changing the operation state of the air conditioner.

In the mobile terminal, the controller may display on at least one region of the display unit a graphic object that corresponds to the operation information relating to the wind that is output from the air conditioner.

In the mobile terminal, corresponding to activation of an augmented reality (AR) mode, the controller may output the state information on the air conditioner including the operation information relating to the wind that is output, to the vicinity of the at least one graphic object.

To achieve these and other advantages and in accordance with the purpose of this specification, as embodied and broadly described herein, there is provided a method of controlling a mobile terminal including a wireless communication unit that is configured to communicate with an air conditioner, the method including capturing an image of at least one photographic subject, outputting to a display unit the image that includes at least one graphic object corresponding to the at least one photographic subject, respectively, and outputting state information on the air conditioner, which includes operation information relating to a wind that is output from the air conditioner, to the vicinity of the graphic object corresponding to the air conditioner, if the at least one photographic subject is the air conditioner.

In the method, when a touch is applied to a region to which the state information is output, a control signal for controlling the air conditioner may be transmitted to the air conditioner.

In the method, based on at least one touch, among the different-type touches that are applied to the region to which the state information is output, and based on the extent to which the at least one touch is applied to the region, the different control signals for controlling the air conditioner may be transmitted to the air conditioner.

In the method, the state information may include an image object indicating the operation information relating to a force of the wind that is output from the air conditioner, the control signal for controlling the force of the wind may be generated if a pinch-in or pinch-out type touch is applied to the image object, and the extent to which the force of the wind is controlled may differ according to the extent to which the pinch-in or pinch-out touch is applied to the image object.

In the method, the operation information may include an image corresponding to a wind that is output from the air conditioner, the graphic object corresponding to the air conditioner may be output to the display unit, and the image object may be output to the vicinity of a region of the graphic object corresponding to the air conditioner, the region which corresponds to a position on the air conditioner, from which the wind is actually output.

In the method, the control signal may be an optimal-state control signal for controlling at least one operation state of the air conditioner, which enables the air conditioner to operate in an optimal state.

To achieve these and other advantages and in accordance with the purpose of this specification, as embodied and broadly described herein, there is provided a method of controlling a mobile terminal including a wireless communication unit that is configured to communicate with an air conditioner, the method including capturing an image of a photographic subject that falls within a range of a viewing angle through a camera, outputting on a display unit at least one graphic object corresponding to the photographic subject that is positioned within the range of the viewing angle of the camera, and outputting state information on the air conditioner, which includes operation information relating to a wind that is output, to the vicinity of the at least one graphic object, if the wind that is output from the air conditioner reaches the photographic subjects, in which in the outputting of the state information, although the air conditioner does not fall within the range of the viewing angle of the camera, the state information is output to the vicinity of the at least one graphic object.

In the method, visual information corresponding to the state information on the air conditioner, which is received from the air conditioner, may be output to at least one region of the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
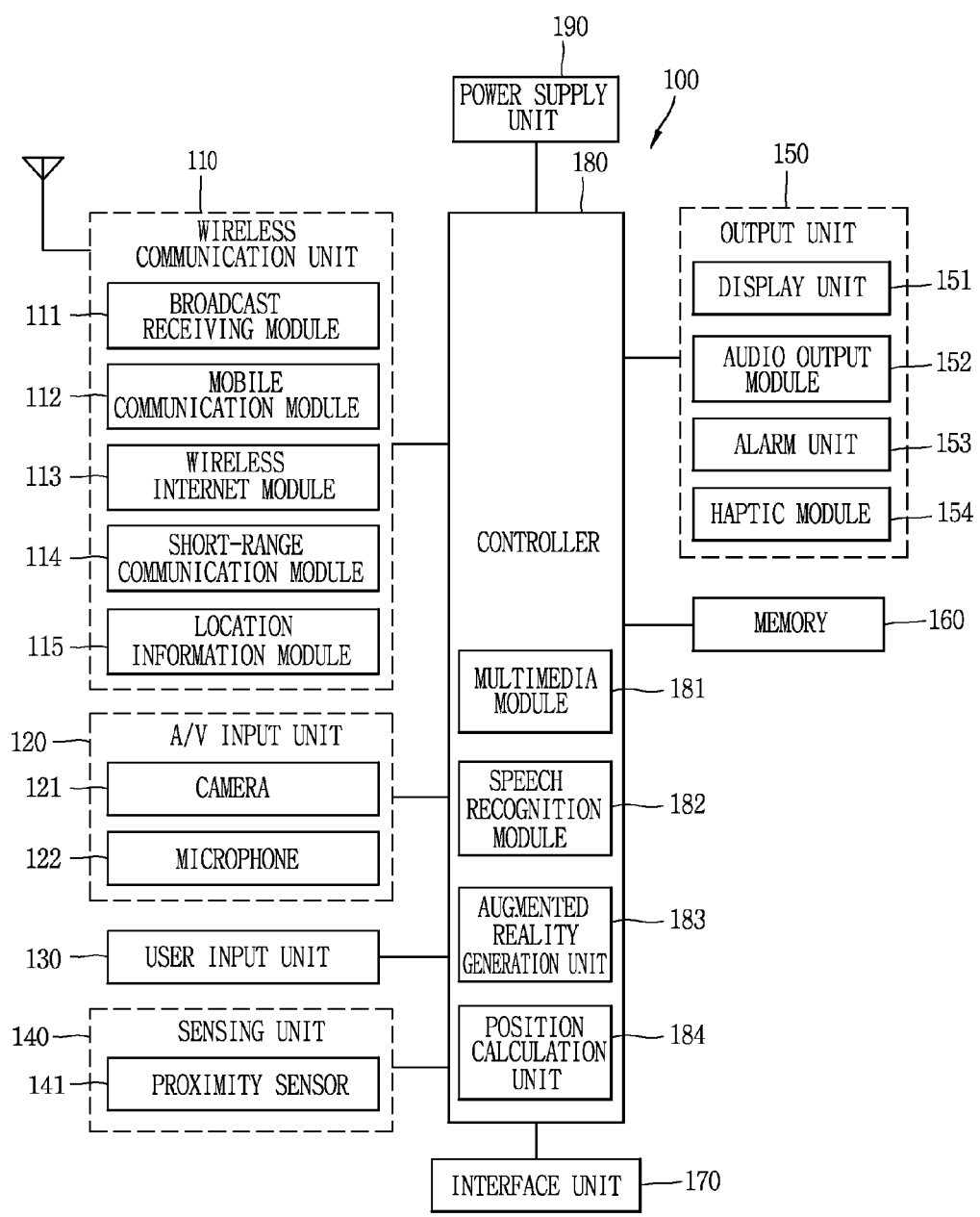
FIG. 1 is a block diagram illustrating a mobile terminal according to one embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display 151, an audio output unit 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output unit 152 may output audio data received from the radio communication unit 110 or stored in the memory 160 in a call signal reception mode, a call mode, a record mode, a voice recognition mode, a broadcast reception mode, and the like. Also, the audio output unit 152 may provide audible outputs related to a particular function (e.g., a call signal reception sound, a message reception sound, etc.) performed in the mobile terminal 100. The audio output unit 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the audio output unit 152. Therefore, the display 151 and the audio output unit 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

In addition, pieces of information necessary for displaying the augmented reality (AR) on the display unit 151 are stored in the memory 160. For example, various graphic objects used for displaying the augmented reality are stored in the memory 160.

In addition, information for calculating a relative position of the mobile terminal 100 is stored in the memory 160. For example, coordinates-expressed information on at least one home appliance (for example, an air conditioner) that can serve as a reference is stored in the memory 160.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

In addition, the controller 180 displays an augmented reality (AR) image on the display unit 151. The augmented reality here refers to the outputting of one image that results from superimposing a virtual image onto an image of a photographic subject. The controller 180 displays the graphic object indicating additional information on the photographic subject on the augmented reality image and displays the augmented reality image on the display unit 151 along with the image of the photographic subject. For example, the controller 180 outputs state information on a specific home appliance on a screen through the augmented reality image.

To do this, the controller 180 includes an augmented reality generation unit 183 that generates the augmented reality image. The augmented reality generation unit 183 may be provided within the controller 180 or may be provided separately from the controller 180.

In addition, the controller 180 controls operation state of at least one home appliance through a user touch input applied to the graphic object that is included in the augmented reality image. For example, corresponding to the user touch input applied to the graphic object indicating the operation state of the powered-off home appliance, the controller 180 controls the wireless communication unit 110 in such a manner that a control signal for powering-on the home appliance is transmitted.

At this point, of course, the controller 180 displays the state information on the multiple powered-off home appliances as the graphic object, and corresponding to the user touch input, transmits the control signal to at least one or more of the home appliances among the multiple home appliances.

Additionally, the controller 180 includes a position calculation unit 184. The position calculation unit 184 here is provided within the controller 180 or is provided outside the controller 180. The controller 180 calculates the position of the mobile terminal through the position calculation unit 184 and displays the result on the display unit 151. The position of the mobile terminal here is a relative position with a position of one among the home appliances serving as the reference. For example, the position calculation unit 184 uses the coordinates-expressed information on one among the home appliances, which is stored in the memory 160.

In addition, corresponding to the user touch input applied to the calculated position, the controller 180 may transmit the control signal for controlling a specific home appliance. For example, the controller 180 calculates a proper air volume from a distance from the calculated position of the mobile terminal to an air conditioner. Then, the controller 180 transmits to the air conditioner a control signal with which the air conditioner outputs a wind according to the determined air volume.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
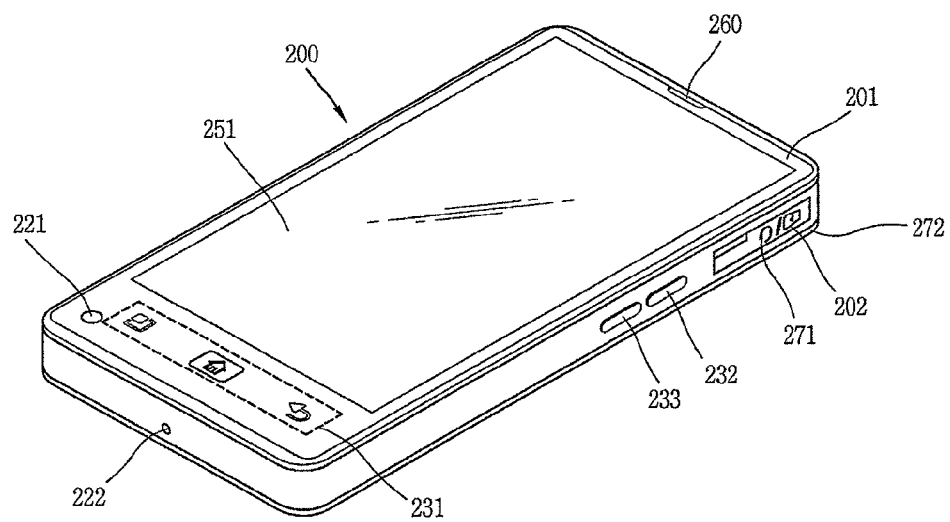
FIGS. 2A and 2B are perspective diagrams, each illustrating the mobile terminal according to one embodiment of the present invention when viewed from the front side.
Figure 2B:
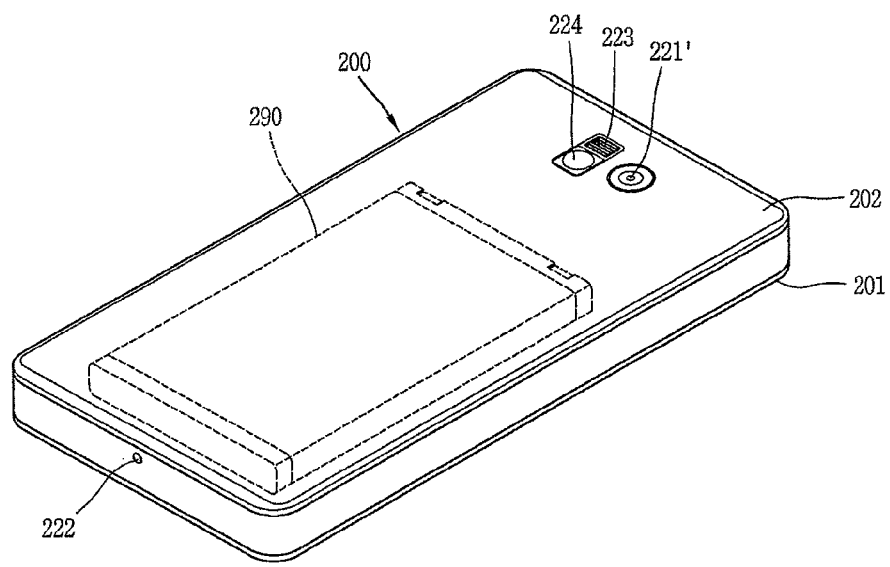

FIG. 2A is a front perspective view of the mobile terminal according to an embodiment of the present invention, and FIG. 2B is a rear perspective view of the mobile terminal according to an embodiment of the present invention The mobile terminal 200 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 200 has a front surface, side surfaces and a rear surface. The body has two ends in a lengthwise direction.

A case (casing, housing, cover, etc.) forming an outer appearance of the body 200 may include a front case 201 and a rear case 202. A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

At the front case 201, may be disposed a display 251, an audio output unit 260, a camera 221, user input units 231, 232 and 233, etc.

The display 251 occupies most parts of a main surface of the front case 201. The audio output unit 260 and the camera 221 are arranged at two ends of the stereoscopic display 251.

Various types of visual information may be displayed on the display 251. Such information may be displayed in the form of texts, numbers, symbols, graphics, icons, etc.

For input of such information, at least one of texts, numbers, symbols, graphics and icons are arranged in the form of a keypad. Such keypad may be called 'SOFT KEYS'.

The display 251 may be entirely operated, or partially operated as the entire region is divided into a plurality of regions. In the latter case, the plurality of regions may be operated in an associated manner.

The user input unit 130 is manipulated to receive a command for controlling the operation of the mobile terminal 200, and may include a plurality of manipulation units 231, 232 and 233. The manipulation units 231, 232 and 233 may be referred to as manipulating portions, and may include any type of ones that can be manipulated in a user's tactile manner.

Commands inputted through the first to third user input units 231, 232 and 233 may be variously set. For instance, the first manipulation 231 is configured to input commands such as START, END, SCROLL or the like, and is arranged at a region adjacent to one end of the display 251. Here, said one end is opposite to another end of the display 251 where the audio output unit 260 is arranged.

The second manipulation unit 232 and the third manipulation unit 233 are configured to input commands for controlling a level of sound outputted from the audio output unit 260, or commands for converting the current mode of the display 251 to a touch recognition mode.

A wired/wireless headset port 271 and a wired/wireless data port 272 may be arranged on one side surface of the mobile terminal 200. The ports 271 and 272 are configured as an example of the interface 170 (refer to FIG. 1).

Referring to FIG. 2b, a camera 221' may be additionally provided on the rear case 202. The camera 221' faces a direction which is opposite to a direction faced by the camera 221 (refer to FIG. 2a), and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the terminal body so as to rotate or pop-up.

A flash 223 and a mirror 224 may be additionally disposed close to the camera 221'. The flash 223 operates in conjunction with the camera 221' when taking a picture using the camera 221'. The mirror 224 can cooperate with the camera 221' to allow a user to photograph himself in a self-portrait mode.

An audio output unit may be additionally arranged on a rear surface of the body. The audio output unit may cooperate with the audio output unit 260 (refer to FIG. 2a) so as to implement a stereo function. Also, the audio output unit may be configured to operate as a speakerphone.

A broadcast signal receiving antenna, as well as an antenna for calling, may be disposed on a side surface of the terminal body. The antenna of the broadcast receiving module 111 (refer to FIG. 1) may be configured to be withdrawn from the terminal body.

A microphone 222, an interface, etc. may be provided at the terminal body. The microphone 222 is disposed at a region adjacent to one end of the display. Said one end is opposite to another end of the display where the audio output unit 260 is disposed.

The user input units 232 and 233, a connection port, etc. may be disposed on side surfaces of the front case 201 and the rear case 202.

The connection port is configured to receive data or power from an external device, and to transmit it to each component inside the mobile terminal 200. Alternatively, the connection port is configured to transmit data inside the mobile terminal 200 to an external device. The connection port may be one example of the interface 170 (refer to FIG. 1).

A power supply unit 290 for supplying power to the mobile terminal 200 is mounted to the terminal body. The power supply unit 290 may be mounted in the terminal body, or may be detachably mounted to the terminal body.

As described above, in the mobile terminal according to one embodiment of the present invention, the user can control the home appliance using the augmented reality. The home appliances here refer to various apparatus using electricity, such as the air conditioner. Therefore, the mobile terminal according to one embodiment of the present invention can be used for controlling whatever apparatus, but an example is described below in which the air conditioner, among the home appliances, is controlled using the mobile terminal is described below.

Figure 3:
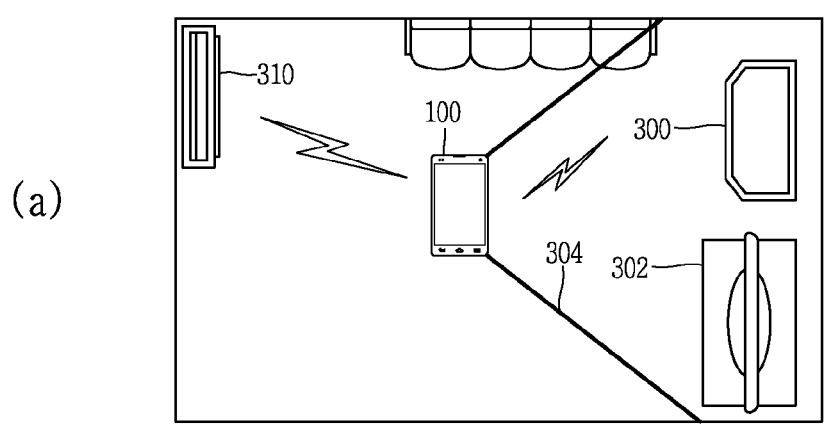
FIGS. 3(a) and 3(b) are diagrams for describing an environment in which the mobile terminal according to one embodiment of the present invention can operate.
Figure 3:
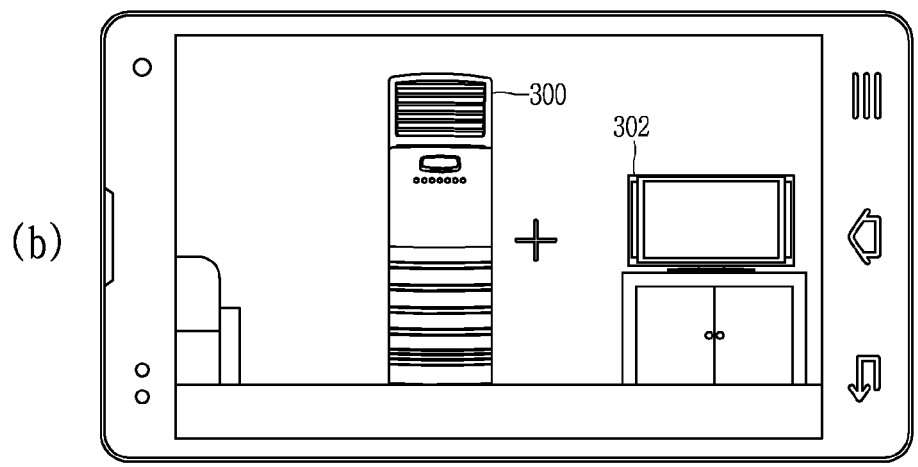

On the other hand, FIG. 3 is a diagram for describing an environment in which the mobile terminal according to one embodiment of the present invention can operate.

The mobile terminal 100 according to one embodiment of the present invention, as illustrated in FIG. 3, can have access to at least one air conditioner. For example, if at least one air conditioner is positioned within a given distance from the mobile terminal or the mobile terminal enters a given area (for example, a home), the controller 180 automatically has access to the air conditioners that are located within the given distance or the corresponding area.

The mobile terminal 100 here has access to at least one among the air conditioners 300 and 310 in various ways. For example, the mobile terminal 100 has access to at least one among the air conditioners 300 and 310, using a wireless technology, such as Wi-Fi, near field communication (NFC), Bluetooth, or infrared communication (Irda).

In such a case, of course, the controller 180 may have access to only one specific air conditioner according to a predetermined condition. For example, the controller 180 may have access to only one specific air conditioner according to the distance or may have access to only one specific air conditioner according to the user selection. In addition, if an image of only one specific air conditioner as the photographic subject is received by the camera 121, the controller 180 may have access to only such an air conditioner.

In addition, if the accessible air conditioner is available, the controller 180 outputs an alarm alerting this to the user. The alarm is such that a graphic object configured from at least one among a predetermined image and predetermined text is displayed on the display unit 151. In addition, the controller 180 may output the alarm using at least one among vibration and sound through the alarm unit 153, along with the graphic object being displayed on the display unit 151.

Then, the controller 180 drives the camera 121 if the user operates the mobile terminal, corresponding to the alarm, for example, if the user touch input applied to a region on which the graphic object for the alarm is displayed is detected or if one among predetermined multiple operation units is operated. Then, if only one specific air conditioner as the photographic subject is received by the camera 121, the controller 180 may have access to only such an air conditioner.

Specifically, referring to FIGS. 3(a) and 3(b), if the mobile terminal 100 enters an area illustrated in FIG. 3(a), the mobile terminal 100 has access to all of the air conditioners 300 and 310. Alternatively, the mobile terminal 100 has access to only one air conditioner among the air conditioners 300 and 310 according to the user selection.

In addition, as described above, the controller 180 may output the alarm for having access to at least one among the air conditioners 300 and 310. Then, when a user input corresponding to the alarm that is output is detected, the controller 180 drives the camera 121 as illustrated in FIG. 3(*a*). Then, in this case, images corresponding to the photographic subjects included within the viewing angle 304 are displayed on the display unit 151 as illustrated in FIG. 3(*b*).

FIG. 3(*b*) illustrates an example of an image that is displayed on the display unit 151 of the mobile terminal 100. FIG. 3(*b*) illustrates the example in which images of the air conditioner 300 and a TV set 302, the images of the photographic subjects included within a viewing angle 304 of the camera 121 are received. In this case, the controller 180 has access to only the air conditioner 300 included within the viewing angle 304 of the camera 121, among the air conditioners 300 and 301.

In this manner, if the camera 121 is driven, the controller 180 selectively has access to only the photographic subject included in the image received through the camera 121. However, of course, even though the camera 121 is not driven, the controller 180 can have access to one specific air conditioner according to the user selection. In addition, of course, even though the alarm or the camera drive control by the user is not available, the controller 180 may drive the camera 121, corresponding to a selection by the user of an augmented reality (AR) mode. In this case, when the camera 121 is driven, the controller 180 has access to one among the photographic subjects included in the image received within the viewing angle of the camera 121.

In addition, the example in which the controller 180 has access to at least one among the air conditioners 300 and 310 is described above referring to FIGS. 3(*a*) and 3(*b*), but this is just one example and the apparatus to which the controller 180 can have access is not necessarily limited to the air conditioner. For example, as illustrated in FIG. 3(*b*), if the air conditioner 300 and the TV set 302 are included as the photographic subjects in the image received within the viewing angle of the camera 121, of course, the controller 180 may have access to at least one among the air conditioner 300 and the TV set 302, corresponding to the user selection and may display the augmented reality image relating to the air conditioner 300 or the TV set 302 on the display unit 151.

In this manner, when having access to at least one air conditioner, the controller 180 outputs the state information on the accessed air conditioner as the augmented reality image to the display unit 151. Then, corresponding to the user touch applied to at least one graphic object included in the augmented reality image, the controller 180 transmits the control signal to the accessed air conditioner.

Figure 4:
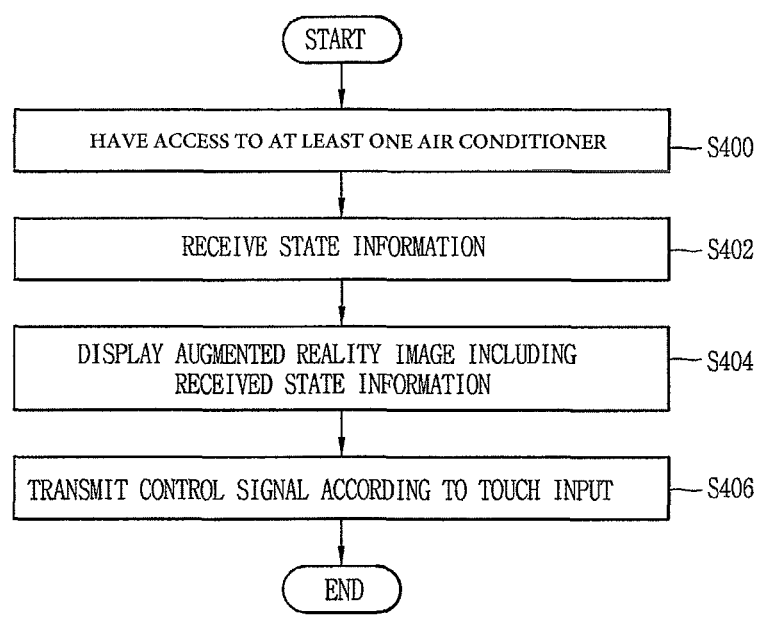
FIG. 4 is a flowchart for describing a method of controlling the mobile terminal according to one embodiment of the present invention.
Figure 5:
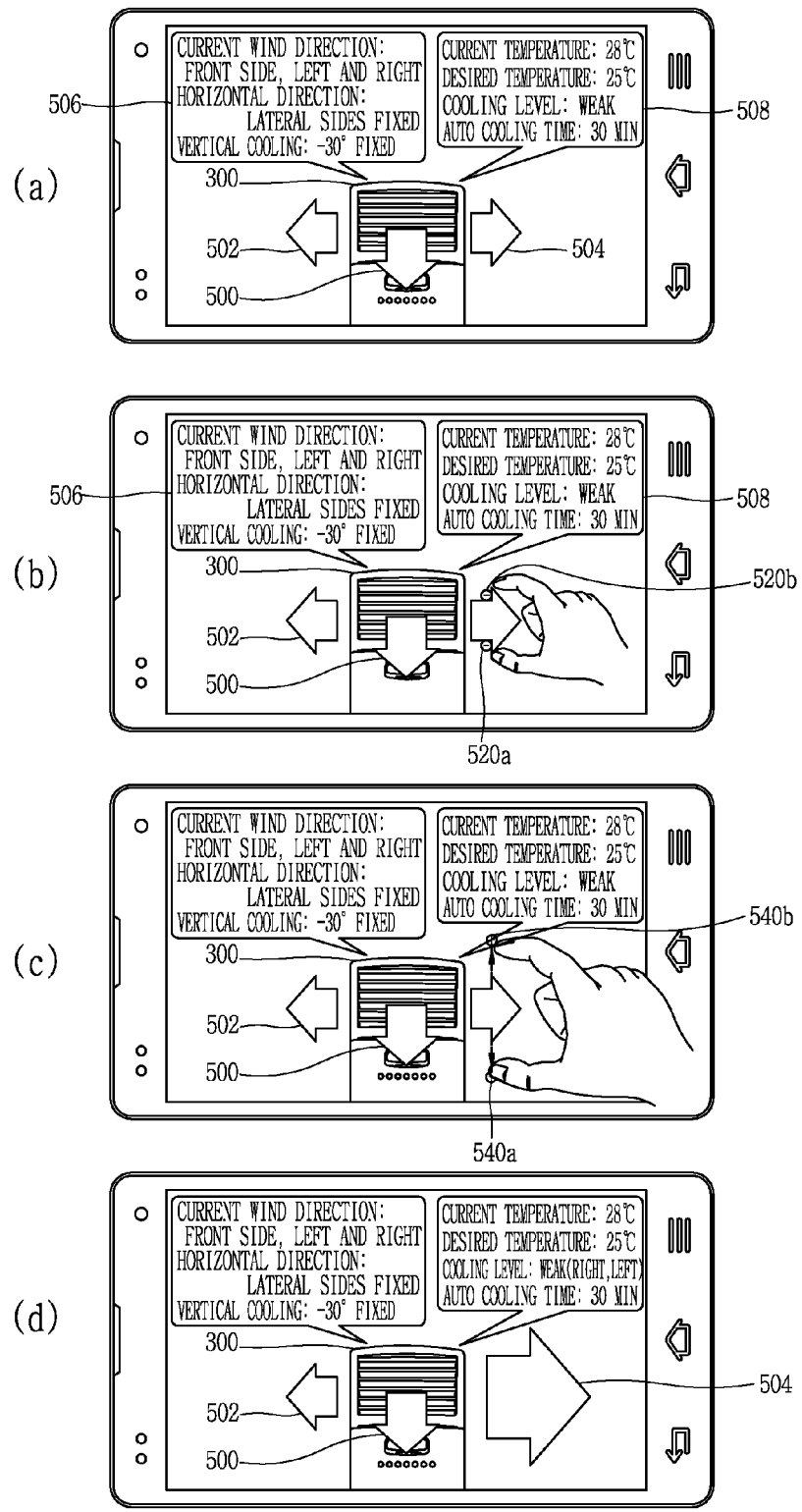
FIGS. 5A to 5D are diagrams for describing the control method in FIG. 4.

FIG. 4 is a flowchart for describing a method of controlling the mobile terminal according to one embodiment of the present invention. FIG. 5 is a diagram for describing the control method in FIG. 4.

Referring to FIG. 4, the controller 180 has access to at least one air conditioner (S400). For example, as illustrated in FIGS. 3(*a*) and 3(*b*), the controller 180 automatically has access to at least one among the air conditioners located within a given area or within a given distance. In addition, if the camera 121 is driven by the selection between the alarm and the augmented reality mode, the controller 180 has access to one, among the photographic subjects displayed on the display unit 151, which corresponds to the user selection.

Then, the controller 180 receives the state information from the accessed air conditioner (S402). The state information here includes an operation state and drive state of the air conditioner or current-state information on the surrounding environment of the air conditioner. The operation state of the air conditioner here refers to information on a desired temperature, or a force of the wind that is currently set in the air conditioner, or information on the time that the air conditioner has operated up to now or currently-preset operation time during which the air conditioner will operate. Then, the operation state of the air conditioner here refers to information on a direction of the wind, which is currently set in the air conditioner, or information on an output type of wind, such as horizontal rotation or vertical rotation. In addition, the state information on the surrounding environment of the air conditioner here refers to information on the surrounding environment that is measured from the air conditioner, that is, information on humidity, intensity of illumination, air cleanness state, or the like.

If at least one air conditioner is accessed, the state information here is transmitted from the accessed air conditioner 300 at the request of the controller 180. For example, when having access to at least one air conditioner according to a predetermined condition or the user selection, the controller 180 requests the accessed air conditioner for the state information, and in response to this request, the accessed air conditioner 300 the state information.

However, in another case, that is, if an external device, such as the mobile terminal 100 is detected, of course, the air conditioner 300 transmits the state information directly to the external device.

For example, if the external device comes within a given distance, or if the external device comes within a given area, the air conditioner 300 detects the external device through wireless communication with the external device or using various means such as identification information that is emitted from the external device. In addition, if the external device is detected through a pre-installed camera (not illustrated), the air conditioner 300 may detect the external device. In this case, the air conditioner 300 transmits to the detected external device the state information including at least one among the information on its own operation state, the information on its drive state, and the information on the surrounding environment.

At this point, the information on the drive state refers to information including the information on force or a direction of the wind that is output from the air conditioner 300. The information on the operation state refers to information including the information on that desired temperature that is set in the air conditioner 300, or the operation time, or the information on the preset operation time.

On the other hand, the controller 180 generates the augmented reality image relating to the currently-accessed air conditioner 300, based on the received state information. The augmented reality image here includes at least one or more graphic objects corresponding to the state information. For example, the controller 180 generates the graphic object to the size corresponding to air volume information included in the received state information, or may display the graphic object in the direction corresponding to wind direction information according to the drive state of the air conditioner 300.

The controller 180 displays to the display unit 151 the augmented reality image that is generated corresponding to the user selection (S404). For example, the controller 180 generates the augmented reality image relating to one among the photographic subjects that come within the viewing angle 304 of the camera 121 and displays the result. For example, as illustrated in FIG. 3(*b*), the air conditioner 300 is included within the viewing angle 304 of the camera 121, the controller 180 outputs the augmented reality image to the display unit 151 along with the image received from the camera 121.

FIG. 5(a) illustrates an example of this. Referring to FIG. 5(a), the controller 180 displays, on the vicinity of the air conditioner 300, the augmented reality image including the state information received from the air conditioner 300.

The augmented reality image includes the various graphic objects corresponding to the state information on the air conditioner 300. For example, the augmented reality image includes an arrow image that differs in size or shape according to the direction and the force of the wind that is output from the air conditioner. That is, as illustrated in FIG. 5(a), the controller 180 displays through arrow images 500, 502 and 504 the direction and the force of the wind that is output from the air conditioner 300.

For example, the arrow image 500 indicating the front indicates the force and the direction of the wind that is output from the front of the air conditioner 300. Then, the arrow image 502 indicating the left lateral side indicates the force and the direction of the wind that is output from the left lateral side of the air conditioner 300. The arrow image 504 indicating the right lateral side indicates the force and the direction of the wind that is output from the right lateral side of the air conditioner 300. The arrow images 500, 502, and 504 are displayed in the form of a fixed image, that is, in the form of a stationary image. Alternatively, the arrow images 500, 502, and 504 may be displayed in the form of a dynamic image. The arrow images 500, 502, and 504 in the form of a dynamic image move in a predetermined shape in an arrow direction within a region on which the arrow images are displayed.

Furthermore, the augmented reality image is an image that includes text. For example, the controller 180 outputs a graphic object 508 that includes the information on the operation state of the air conditioner in the form of text. The information on the operation state of the air conditioner includes the current temperature, the desired temperature, or the information on the time that the air conditioner has operated up to now, that is, the information on the preset operation time during which the air conditioner will operate.

Furthermore, of course, the controller 180 displays the drive state of the air conditioner 300 as text information in order to provide more precise information than when the information is displayed through the existing arrow images 500, 502, and 504. For example, as illustrated in FIG. 5(a), the controller 180 displays the augmented reality image through a graphic object 506 that includes in the form of text the information on the current air direction, that is, the information on the output type of the wind that is output through a front outlet grille or left and right lateral outlet grilles and the information on the direction in which the wind is output through the front outlet grille or the left and right lateral outlet grilles.

If the augmented reality image is output on the display unit 151, the controller 180 generates the control signal for controlling the air conditioner through the augmented reality image. For example, the controller 180 detects the user input applied to the augmented reality image. If the user touch input is detected as being applied to a region on which one specific graphic object included in the augmented reality image is displayed, the controller 180 recognizes the user input as being applied to the operation state of the air conditioner or the drive state that corresponds to the corresponding graphic object.

That is, if the user touch is detected as being applied to one among the arrow images 500, 502, and 504, the controller 180 recognizes that the user input is applied to the output force or the output direction of the wind that corresponds to one among the arrow images 500, 502, and 504.

Then, the controller 180 transmits to the air conditioner 300 the control signal for controlling the drive state or the operation state of the air conditioner 300, corresponding to the user input (S406). In this case, the mobile terminal 100 is used as a remote controller for the air conditioner 300. For example, the controller 180 transmits to the air conditioner 300 the control signal for changing the output force or the output direction of the wind that corresponds to one among the arrow images, corresponding to the user touch input.

In addition, of course, the extent to which the air conditioner 300 is controlled differs depending to the extent of the user touch applied to the region on which the state information on the air conditioner 300 is displayed. For example, if a user drag input or a specific touch gesture input is detected as being applied to the region on which the graphic object for the force of the wind is displayed, the controller 180 transmits the control signal to change the force of the wind to force that depends on the user input.

For example, corresponding to a pinch-in gesture or a pinch-out gesture toward one among the arrow images 500, 502, and 504, the controller 180 changes the force of at least one among the wind that is output through the front outlet grille and the wind that is output through the left and right lateral outlet grilles. The pinch-in gesture or the pinch-out gesture here refers to a user touch gesture in which at least two touch inputs are moved close to each other (the pinch-in) or are moved away from each other (the pinch-out).

FIGS. 5(b), 5(c) and 5(d) illustrate an example of this. First, referring to FIG. 5(b), if user touch inputs 520a and 520b are detected as being applied to the region on which the arrow image 504 corresponding to the wind that is output through the right lateral outlet grille is displayed, the controller 180 recognized that the user selects the control of the wind that is output through the right lateral outlet grille.

In this case, if the user touch inputs 520a and 520b are moved away from each other through the pinch-put gesture 520a and 520b as illustrated in FIG. 5(c), the controller 180 recognizes this. Then, corresponding to user touch inputs 540a and 540b according to the pinch-put gesture, the controller 180 changes the force of the wind that is output through the right lateral outlet grille.

In addition, the controller 180 may transmit the control signal for separately controlling one wind among the winds that are output from the air conditioner 300. For example, as illustrated in FIG. 5(c), if the user pinch-out touch inputs 540a and 540b are detected as being applied to the wind that is output through the right lateral outlet grille, the controller 180 changes only the force of the wind 504 that is output through the right lateral outlet grille, corresponding to the user pinch-out touch inputs 540a and 540b. Then, as illustrated in FIG. 5(d), the operation state of the air conditioner 300 that is changed corresponding to the user touch input is displayed on the display unit 151 through the augmented reality image.

The example in which the force of the wind is changed by the user pinch-put gesture is described above, but of course, the force of the wind that is output from the air conditioner 300 can be simply changed also by a touch and drag operation by the user. In addition, the example in which the multiple winds that are output from the air conditioner 300, only the force of one wind that corresponds to the user touch input is changed is described above, but of course, the forces of the winds that are output from the air conditioner 300 can be changed only by the input applied to one among the arrow images.

FIGS. 6(a), 6(b) and 6(c) are diagrams illustrating an example of this. First, as illustrated in FIG. 6(a), if a user touch input 600 is detected as being applied to the region on which the arrow image 504 is displayed, the controller 180 recognizes that the control of the wind corresponding to the arrow image 504, that is, the control of the wind that is output from the right lateral outlet grille of the air conditioner 300 is selected by the user.

Figure 6:
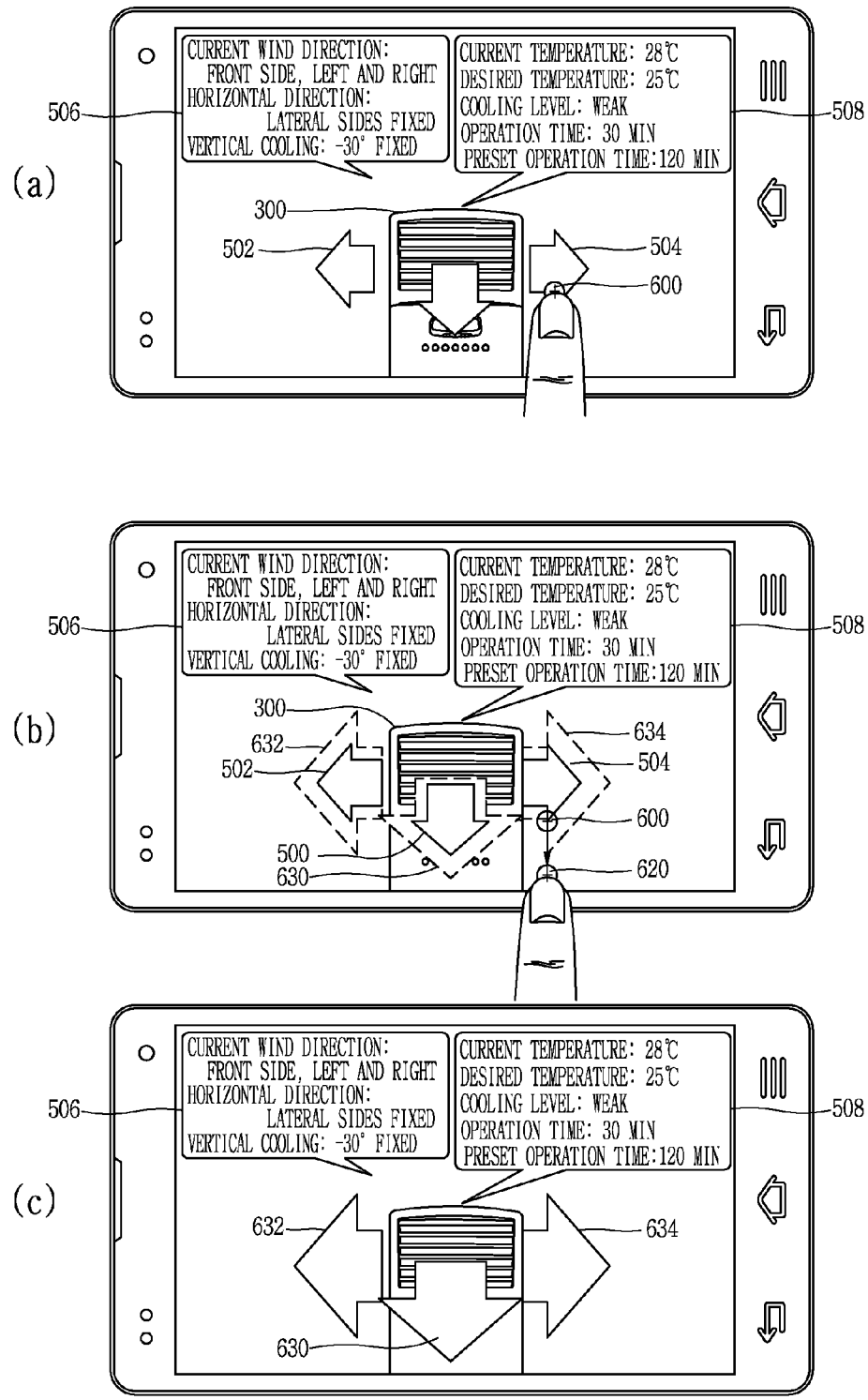
FIGS. 6A to 6C are diagrams for describing a method of adjusting a force of a wind that is output from air conditioner, through augmented reality in the mobile terminal according to one embodiment of the present invention.

As illustrated in FIG. 6(*b*), if the user input of a touch and drag 600 and 620 is applied in this state, the controller 180 changes the forces of all the wind that are output from the air conditioner 300 in order to correspond to the user input. Then, when the force of the wind that is output from the air conditioner 300 is changed, the augmented reality image reflecting the change is displayed on the display unit 151 as illustrated in FIG. 6(*c*).

That is, arrow images 630, 632, and 634 that have the sizes corresponding to the changed forces of the wind, respectively, are displayed on positions that correspond to their respective winds, and a graphic object 670 including the text information corresponding to the changed operation state is displayed on the display unit 151.

Therefore, with the mobile terminal 100 according to one embodiment of the present invention, the user can not only know a current state of the air conditioner 300 more accurately through the augmented reality image relating to the air conditioner 300, but also control the air conditioner to the desired state through the augmented reality image while intuitively checking the state of the air conditioner.

On the other hand, the controller 180 may display a guide image corresponding to the user touch input on the display unit 151. For example, as illustrated in FIG. 6(*b*), the controller 180 displays on the display unit 151 the arrow images 630, 632, and 634, as guide images, which have the sizes corresponding to the user input of the touch and drag inputs, respectively.

The guide image here is displayed in various forms. For example, the controller 180 displays the guide image with a dotted line illustrated in FIG. 6(*b*), or may display the regions on which the arrow images 500, 502, and 504 are displayed, in different colors or in translucent colors. In addition, of course, the controller 180 may display the guide image as the blinking graphic object.

The guide images for all the arrow images 500, 502, and 504 indicating the directions of the winds that are output from the air conditioner 320, respectively, may be displayed as illustrated in FIG. 6(*b*), but of course, the guide image for only one arrow image among the arrow images 500, 502, and 504 can be displayed. That is, for example, of course, the guide image corresponding to the user pinch-out 540A and 540B can be displayed on the display unit 151 as illustrated in FIG. 5(*c*).

Furthermore, if the user input is detected through the augmented reality image, of course, the controller 180 may change the direction of the wind that is output from the air conditioner 300 based on the this detection. For example, corresponding to the user's input applied to one among the regions on which the arrow images are displayed, the controller 180 changes the direction of one among the winds that are output from the air conditioner 300.

Figure 7A:
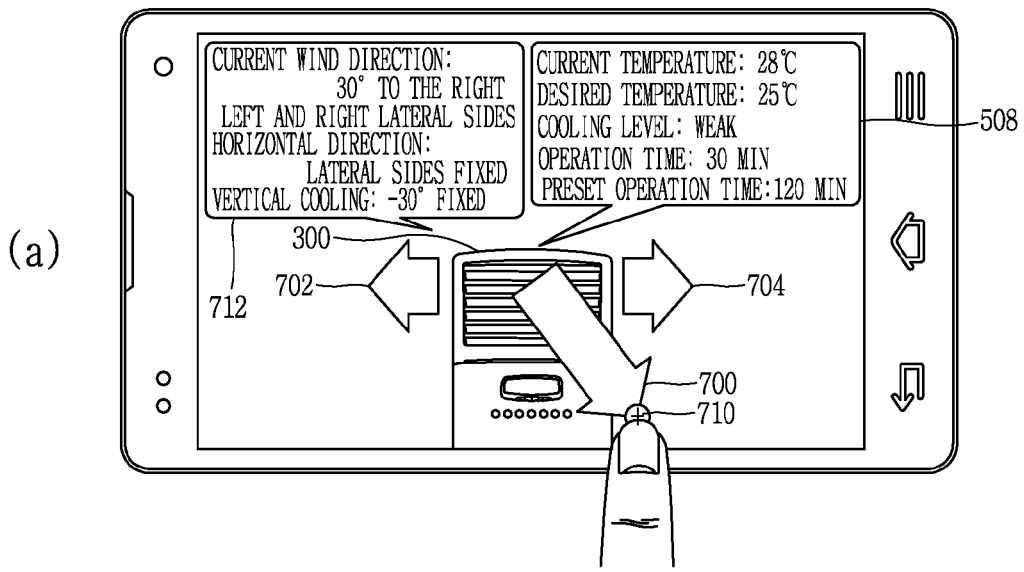
FIGS. 7a(a) and 7a(b) and FIGS. 7b(a) and 7b(b) are diagrams for describing a method of adjusting a direction of the wind that are output from the air conditioner, through the augmented reality in the mobile terminal according to one embodiment of the present invention.
Figure 7A:
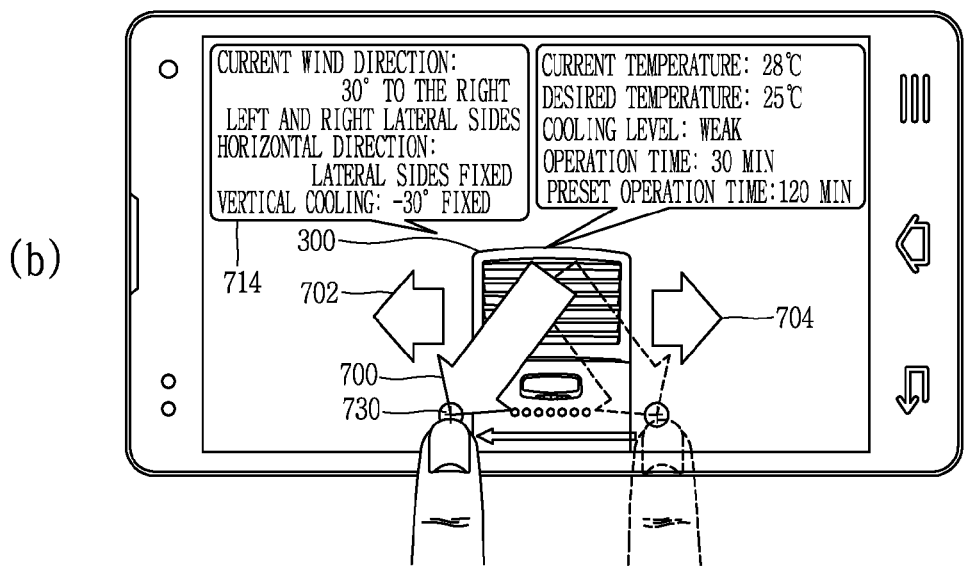

FIGS. 7*a*(*a*) and 7*a*(*b*) illustrate an example of this. FIG. 7*a*(*a*) illustrates the example in which among arrow images 700, 702, and 704 that correspond to the winds that are output from the air conditioner 300, respectively, a user touch input 710 is detected as being applied to the region on which the arrow image 700 is displayed.

It is apparent from a graphic object 712 indicating the drive state of the air conditioner 300 in FIG. 7*a*(*a*) that the wind is output from the front outlet grille at an angle of 30 degrees to the right with respect to the front. Therefore, the arrow image 700, the graphic object corresponding to the wind that is output from the front outlet grille is displayed at an angle of 30 degrees to the right with reference to the front.

In this case, when the user touch input 710 is detected as being applied to the region on which the arrow image 700 is displayed, the controller 180 recognizes that the control of the wind that is output from the front outlet grille is selected. Then, based on the direction of the wind that corresponds to the user input, the controller 180 changes a graphic image that corresponds to the wind that is output from the front outlet grille.

For example, if the user touch 710 is dragged as illustrated in FIG. 7*a*(*b*), the controller 180 changes the arrow image 700 along the direction in which the user touch 710 is dragged. Then, the controller 180 transmits to the air conditioner 300 the control signal for changing the direction of the wind that is output from the front outlet grille along the direction of the changed arrow image 710.

At this point, the controller 180 displays the information on an angle of the wind direction that differ depending on a user drag 730, as the text information, to the graphic object 712 for displaying the drive state. In addition, the controller 180 may display the information on the wind direction that is changed by the input of the user drag 730, in the form of a separate graphic object, for example, in the form of a word balloon or a rectangular. Accordingly, the user can check the wind direction that is changed according to his/her touch and drag, with the text information.

In addition, the controller 180 transmits the control signal for changing the wind direction to the direction in which the drag 730 is input. That is, if the touch input by the user drag 730 is detected as being applied at an angle of 30 degrees to the left with respect to the front, the controller 180 transmits to the air conditioner 300 a signal for changing the direction of the wind that is output from the front outlet grille of the air conditioner 300, by an angle of 30 degrees to the left. Then, a graphic object 714 indicating the drive state of the air conditioner 300 includes the text information reflecting the changed drive state of the air conditioner 300.

Furthermore, the mobile terminal 100 according to one embodiment of the present invention determines the wind direction of the air conditioner 300 that is changed in such a manner that the current position of the mobile terminal 100 is reflected and the wind direction corresponds to the user touch input.

For example, as illustrated in FIGS. 7*a*(*a*) and 7*a*(*b*), if the mobile terminal 100 is positioned in front of the air conditioner 300, the input of the touch and drag 710 and 730 that is applied to the display unit 151 assumes that the touch is dragged from an imaginary position A 758 in a horizontal line with the air conditioner 300 within the viewing angle 770 of the camera 121 to an imaginary position B 760.

Then, the controller 180 calculates a distance from the mobile terminal 100 to the air conditioner 300 by computing the relative position of the mobile terminal 100. Then, if the distance between the mobile terminal 100 and the air conditioner 300 is calculated, the controller 180 computes an angle that the imaginary position A 758 and the imaginary position B 760 makes with respect to the mobile terminal 100.

At this point, the relative position of the mobile terminal 100 with respect to the position of the air conditioner 300 is computed in various ways. For example, the mobile terminal 100 detects the strength or direction of the signal that is received from the air conditioner 300, and based on the result of the computation, calculates the relative position away from the air conditioner 300. In addition, the air conditioner 300 may calculate the relative position of the mobile terminal 100 in the way described above and may transmit the result of the calculation to the mobile terminal 100.

In addition, the controller 180 calculates the relative position of the mobile terminal away from the air conditioner 300 from an image of the air conditioner 300 that is received from the camera 121. For example, software and the like that calculate the distance to the photographic subject and the angle with respect to the photographic subject is embedded into the mobile terminal 100. In addition, the software downloaded over a communication network may be installed on the mobile terminal 100. Alternatively, an application that enables the mobile terminal 100 to have the same function as the software may be installed on the mobile terminal 100.

In addition, the controller 180 calculates the relative position of the mobile terminal 100 away from the air conditioner 300 using the distance to the air conditioner 300, and an angle between the direction in which the image of the air conditioner 300 enters the camera 121 and the direction normal to the front of air conditioner 300, that is, an incident angle with respect to the camera 121. For example, if it is assumed that the incident angle with respect to the camera 121 is 45 degrees and the distance to the air conditioner 300 is 7 m, the position of the mobile terminal 100 is calculated as being 7 m away at an angle of 45 degrees from the direction normal to the front of the air conditioner 300.

The incident angle here is obtained, for example, from the camera provided in the front of the air conditioner 300. That is, an angle that the direction in which the mobile terminal 100 is positioned and the direction normal to the front of the air conditioner 300 make with each other is calculated using a distance between the image of the mobile terminal 100 received from the camera of the air conditioner 300 and a focal point or using the software and the application. Then, the calculated angle may be transmitted, as the incident angle, to the mobile terminal 100. Furthermore, of course, the relative position of the mobile terminal 100 may be calculated directly from the image received from the camera provided in the air conditioner 300 using the software and the application that are described above.

In addition, the controller 180 may calculate the position of the mobile terminal 100 using the coordinates-expressed information that is stored in the air conditioner 300 or the mobile terminal 100. For example, map information on an area in which the air conditioner 300 and the mobile terminal are currently located is stored in the memory 160 of the mobile terminal 100. Then, the controller 180 determines the current position of the mobile terminal 100 from the map information and calculates the relative position of the mobile terminal 100 from the coordinates-expressed information on the air conditioner 300.

Figure 7B:
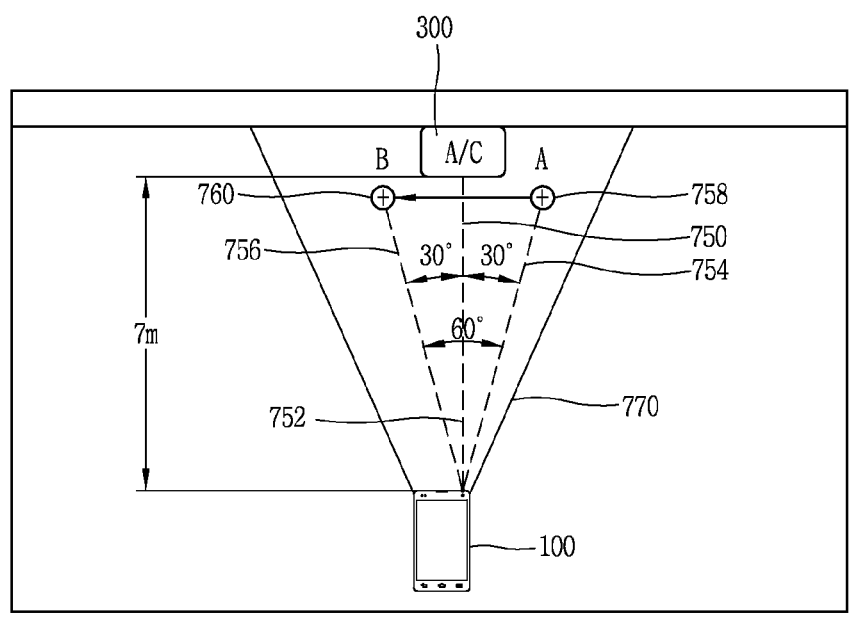
Figure 7B:
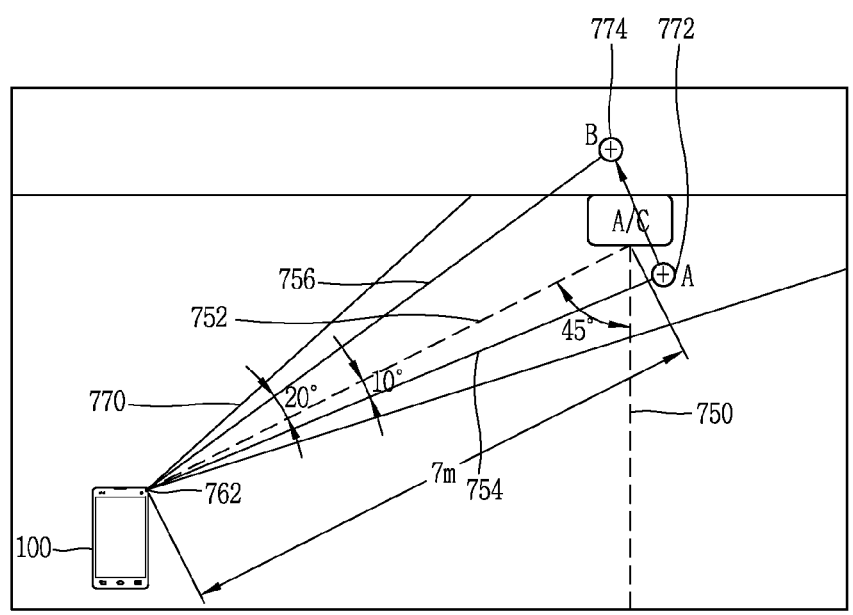

On the other hand, if as a result of calculating the relative position of the mobile terminal 100, the mobile terminal is at a distance of 7 m away from the air conditioner 400 as illustrated in FIG. 7b(a), the angles that the imaginary position A (758) and the imaginary position B (760) make with respect to the direction 752 in which the camera 121 of the mobile terminal 100 captures the image of the air conditioner 300 are 30 degrees to the right and 30 degrees to the left.

Accordingly, a position 710 to which the user touch is detected as being applied and a position 730 in which the user drag is finished are assumed to be moved by an angle of 60 degrees with respect to the mobile terminal 100 to the left of the position 710 to which the user touch is detected to being applied. Therefore, the controller 180 transmits to the air conditioner 300 the control signal for rotating by an angle of 60 degrees to the left the direction of the wind that is currently output from the front outlet grille of the air conditioner 300.

In this manner, the method of changing the direction of the wind that is output from the air conditioner according to the relative position of the mobile terminal 100 and the user input of the touch and drag can be applied even though the mobile terminal 100 is positioned in front of the air conditioner 300. FIG. 7b(b) illustrates an example of this.

Referring to FIG. 7b(b), the controller 180 calculates the position of the mobile terminal 100 in various ways. For example, as illustrated in FIG. 7b(b), the controller 180 calculates the relative position of the mobile terminal 100 using the angle (for example, an angle of 45 degrees in the leftward direction) that a direction in which the camera 121 of the mobile terminal 100 captures the image of the air conditioner 300 and a direction 750 normal to the front of the air conditioner 300 make with respect to each other and a distance (for example, 7 m) from the mobile terminal 100 to the air conditioner 300.

In this case, the user input of the touch 710 and the drag 730 that is applied to the display unit 151 assumes that the touch is dragged from an imaginary position A (772) within the viewing angle of the camera to an imaginary position B (774). Then, if the mobile terminal 100 is at a distance of 7 m away from the air conditioner 300, the angles that the imaginary position A (772) and the imaginary position B (774) make with respect to the direction 752 in which the camera 121 of the mobile terminal 100 captures the image of the air conditioner 300 are 10 degrees to the right and 20 degrees to the left.

At this point, in changing the direction of the wind from the air conditioner 300 according to the user input of the touch 710 and the drag 730, the controller 180 takes into consideration the relative position of the mobile terminal 100, that is, the direction in which the mobile terminal 100 is positioned. For example, the angle (for example, an angle of 45 degrees in the leftward direction) that the direction in which the camera 121 of the mobile terminal 100 captures the image of the air conditioner 300 and the direction 750 normal to the front of the air conditioner 300 make with respect to each other is the direction in which the mobile terminal 100.

For example, the controller 180 calculates the angles that the imaginary position A (772) and the imaginary position B (774) make with respect to the direction 752 in which the camera 121 of the mobile terminal 100 captures the image of the air conditioner 300. In this case, if the calculated angles are 10 degrees to the right and 20 degrees to the left, the controller 180 changes the direction of the wind that is output from the air conditioner 300, based on the result of the calculation.

For example, the controller 180 adds the angle of 10 degrees in the rightward direction that the imaginary position A (772) makes with respect to the direction 752 or the angle of 20 degrees in the leftward direction that the imaginary position B (774) makes with respect to the direction 752, to an angle that the direction in which the mobile terminal 100 is positioned makes with respect to the air conditioner 300, that is, to an angle of 45 degrees in the leftward direction with respect to the direction normal to the front of the air conditioner 300, and thus changes the direction of the wind from the air conditioner 300. For example, the controller 180 transmits the control signal for changing the direction of the wind that is output from the front outlet grille of the air conditioner 300, by an angle of 65 degrees (45 degrees to the left+20 degrees to the left side=65 degrees to the left) to the left with respect to the front.

Furthermore, of course, the mobile terminal according to the embodiment of the present invention changes the direction of the wind that is output from the air conditioner 300, based on the direction corresponding to one among the photographic subjects displayed on the display unit 151.

Figure 8A:
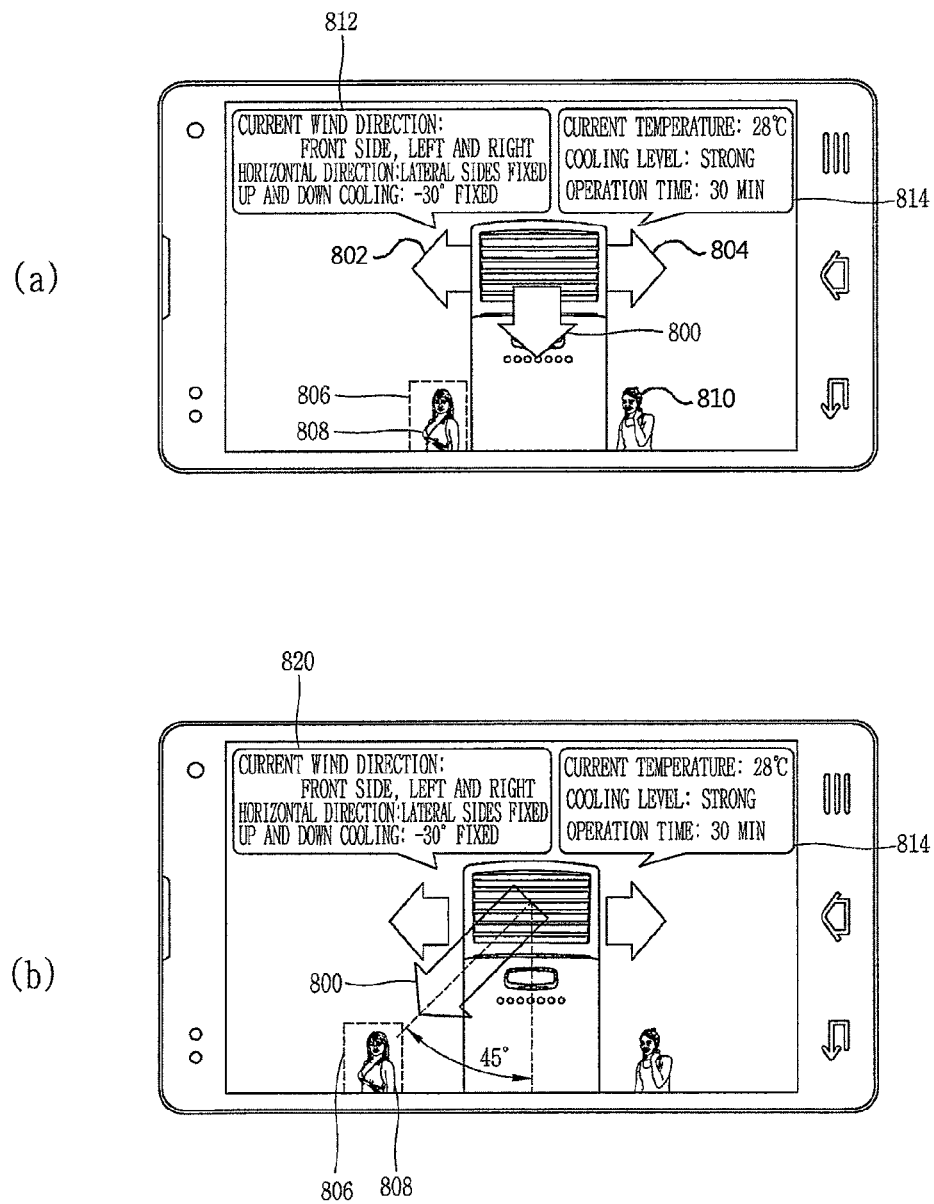
FIGS. 8a(a) and 8a(b) and FIGS. 8b(a) and 8b(b) are diagrams for adjusting another method of adjusting the direction of the wind that are output from the air conditioner, through the augmented reality in the mobile terminal according to one embodiment of the present invention.

FIGS. 8a(a) and 8a(b) are diagrams for describing a method of changing the wind direction based on the direction corresponding to one among the photographic subjects in the mobile terminal according to one embodiment of the present invention.

As illustrated in FIG. 8a(a), the augmented reality image being superimposed onto an image including the air conditioner 300 and multiple photographic subjects 808 and 810 is output to the display unit 151 on the mobile terminal 100 according to one embodiment of the present invention. The augmented reality image here includes a graphic object 814 for indicating the operation state of the air conditioner 300, a graphic object 812 for indicating the drive state of the air conditioner 300, and graphic objects 800, 802, and 804, each for indicating the wind that is output from each outlet grille of the air conditioner 300.

In this case, the controller 180 detects whether the user touch input is applied to the region on which one among the photographic subjects 808 and 810 is displayed, through the sensing unit 140. Then, if the user input is detected as being applied to the region on which the photographic subject 808 is displayed, the controller 180 recognizes that the photographic subject 808 is selected by the user.

In this case, the controller 180 performs highlighting on the photographic subject 808 corresponding to the user touch input. For example, the controller 180 may cause the region, on which the photographic subject 808 corresponding to the user touch input is displayed, to blink, or to be displayed in a different color or may display a guide image 806.

Then, the controller 180 determines the direction of the wind, which is output from the air conditioner 300, to be a direction that corresponds to one among the photographic subjects 808. FIG. 8a(b) illustrates an example of this.

Referring to FIG. 8a(b), if the user touch is detected as being applied to the region on which the photographic subject 808 is displayed, the controller 180 determines the direction of the wind, which is output from the front outlet grille of the air conditioner 300, in the direction corresponding to the photographic subject 808 (by an angle of 45 degrees to the left with respect to the front). Then, the controller 180 transmits the control signal for changing the direction of the wind that is output from the air conditioner 300 according to the determined direction.

At this point, the controller 180 may directly transmit the control signal for changing the direction of the wind from the air conditioner 300. In addition, the controller 180 may transmit to the air conditioner 300 the information on the determined wind direction, that is, the direction information and may perform control in such a manner that the air conditioner 300 changes the wind direction according to the direction information.

In this manner, when the direction of the wind that is output from the air conditioner 300, the augmented reality image indicating the changed state information on the air conditioner 300 is changed is changed as well. Accordingly, the arrow image 800 corresponding to the wind that is output from the front outlet grille of the air conditioner 300 may be changed to the direction corresponding to the photographic subject 808. Then, as illustrated in FIG. 8a(b), the changed drive state of the air conditioner 300, that is, the changed wind direction (for example, an angle of 45 degrees in the leftward direction) is displayed on the graphic object 820 for indicating the drive state of the air conditioner 300.

In this manner, in order to change the direction of the wind from the air conditioner 300 to the direction corresponding to a specific photographic subject, the controller 180 uses the information on the relative position of the mobile terminal 100. More specifically, the controller 180 calculates the relative position of the mobile terminal 100, based on the air conditioner 300 and calculates the relative position of the photographic subject 808 with respect to the mobile terminal 100. Then, the controller 180 calculates the relative position of the photographic subject 808 from the position of the photographic subject 808 and the position of the air conditioner 300 that are calculated based on the mobile terminal 100.

Figure 8B:
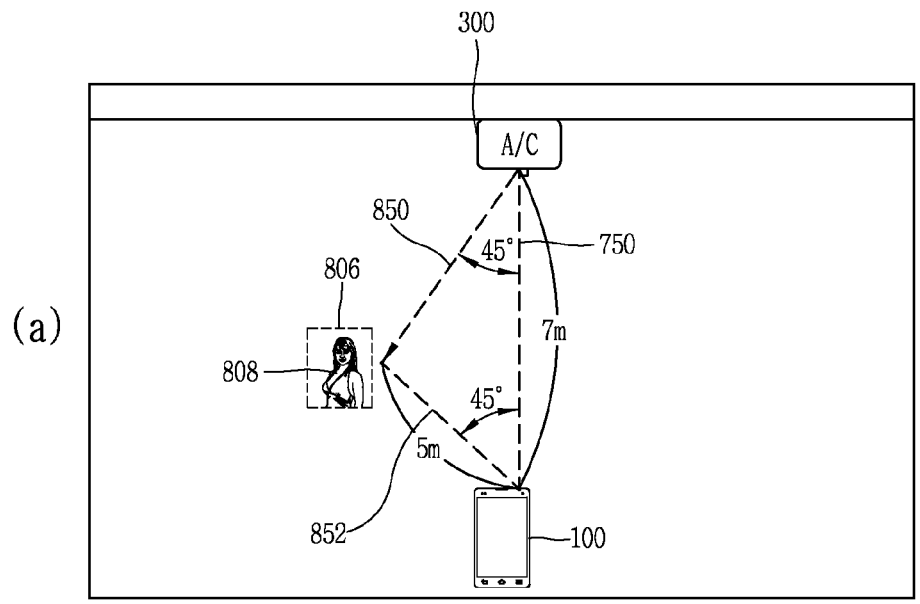
Figure 8B:
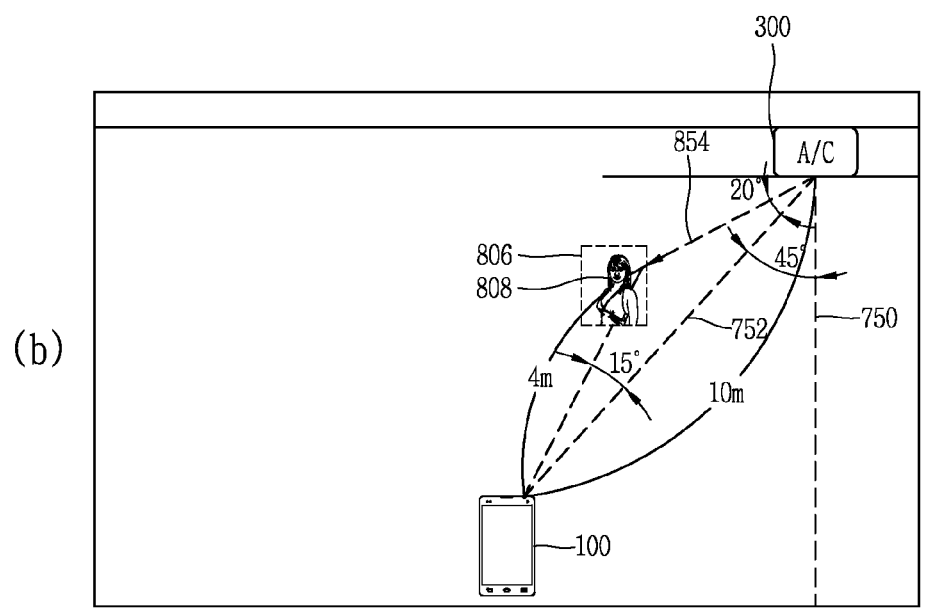

FIG. 8b(a) is a diagram for describing such a method. If the mobile terminal 100 is positioned in the front direction 752 of the air conditioner 300 as illustrated in FIG. 8b(a), the mobile terminal 100 calculates the distance to the air conditioner 300. Then, the mobile terminal 100 calculates the relative position of the photographic subject 808, with the current position of the position of the mobile terminal serving as the reference)

For example, the position of the photographic subject 808 is obtained from the image including all of the air conditioner 300 and the photographic subject 808. That is, the controller 180 calculates the angle (for example, 45 degrees) that the direction in which the photographic subject 808 is positioned and the direction in which the camera 121 of the mobile terminal 100 captures the image of the air conditioner 300 make with respect to each other, using the distance of the photographic subject from a focal point with the position of the air conditioner 300 serving as the reference (for example, the air conditioner 300 being located at the focal point of the image of the air conditioner 300, which is captured by the camera) and the actual distance between the mobile terminal 100 and the photographic subject 808.

If the direction in which the photographic subject 808 is positioned is calculated in this manner with the mobile terminal 100 serving as the reference), the controller 180 calculates the relative position of the photographic subject 808 with the mobile terminal 100 serving as the reference. In this case, the controller 180 draws an imaginary extension line 850 that runs from the air conditioner 300 to the relative position of the photographic subject 808 that is calculated with the mobile terminal 100 serving as the reference. Then, the controller 180 calculates an angle that the imaginary line 850 and the front direction of the air conditioner 300 make with respect to each other and thus determines the direction corresponding to the photographic subject 808. Then, the controller 180 transmits the control signal including the determined direction information or the control signal for changing the direction of the wind that is output from the air conditioner 300 according to the determined direction.

In addition, of course, instead of the controller 180, the air conditioner 300 may determine the direction corresponding to the photographic subject 808. For example, the air conditioner 300 receives the relative position of the photographic subject 808 from the mobile terminal 100 with the mobile terminal serving as the reference). Then, by using this, the air conditioner 300 draws the imaginary extension line 850 that runs between the air conditioner 300 and the photographic subject 808. Then, the air conditioner 300 calculates the angle that the imaginary line 850 and the front direction of the air conditioner 300 make with respect to each other and thus determines the direction corresponding to the photographic subject 808. Then, if the control signal to change the direction of the wind is received from the controller 180 of the mobile terminal 100, the direction may be changed to the determined direction.

In addition, even though the mobile terminal 100 is not located in the front direction of the air conditioner 300, of course, the direction of the wind that is output from the air conditioner 300 is changed in the direction corresponding to the photographic subject 808 in this manner.

FIG. 8*b*(*b*) illustrates an example of this. For example, the present invention can be applied to a case where the front direction of the air conditioner 300 and the direction in which the mobile terminal 100 makes a predetermined angle (for example, an angle of 45 degrees in the leftward direction with respect to the front of the air conditioner 300) with respect to each other.

For example, when it is assumed that the angle that the direction in which the photographic subject 808 is positioned and the mobile terminal 100 makes with respect to each other is 25 degrees and the distance from the mobile terminal 100 to the photographic subject 808 is 4 m, the controller 180 draws the imaginary extension line that runs from the air conditioner 300 to the photographic subject 808. Then, the controller 180 calculates an angle (for example, 20 degrees) that the direction in which the camera 121 of the mobile terminal 100 captures the image of the air conditioner 300 and the imaginary extension line 854 makes with respect to each other.

Then, the controller 180 calculates the direction (for example, 45 degrees+20 degrees=65 degrees) corresponding to the photographic subject 808 by adding the angle (for example, 20 degrees) that the direction in which the image of the air conditioner 300 is captured and the imaginary extension line 854 makes with respect to each other to the angle (for example, 45 degrees) that the front direction of the air conditioner 300 and the direction in which the image of the air conditioner 300 is captured by the camera 121 of the mobile terminal 100 make with respect to each other. Then, the controller 180 transmits to the air conditioner 300 the control signal including the information on the calculated direction corresponding to the photographic subject 808 or transmits the control signal for changing the direction of the air conditioner to the calculated direction corresponding to the photographic subject.

In the mobile terminal 100 according to the embodiment of the present invention, the direction of the wind that is output from the air conditioner 300 is changed in the direction corresponding to the user input of the touch and drag or a specific photographic subject, and additionally the direction of the wind that is output from the air conditioner 300 is changed according to the rotation direction of the mobile terminal 100.

Figure 9:
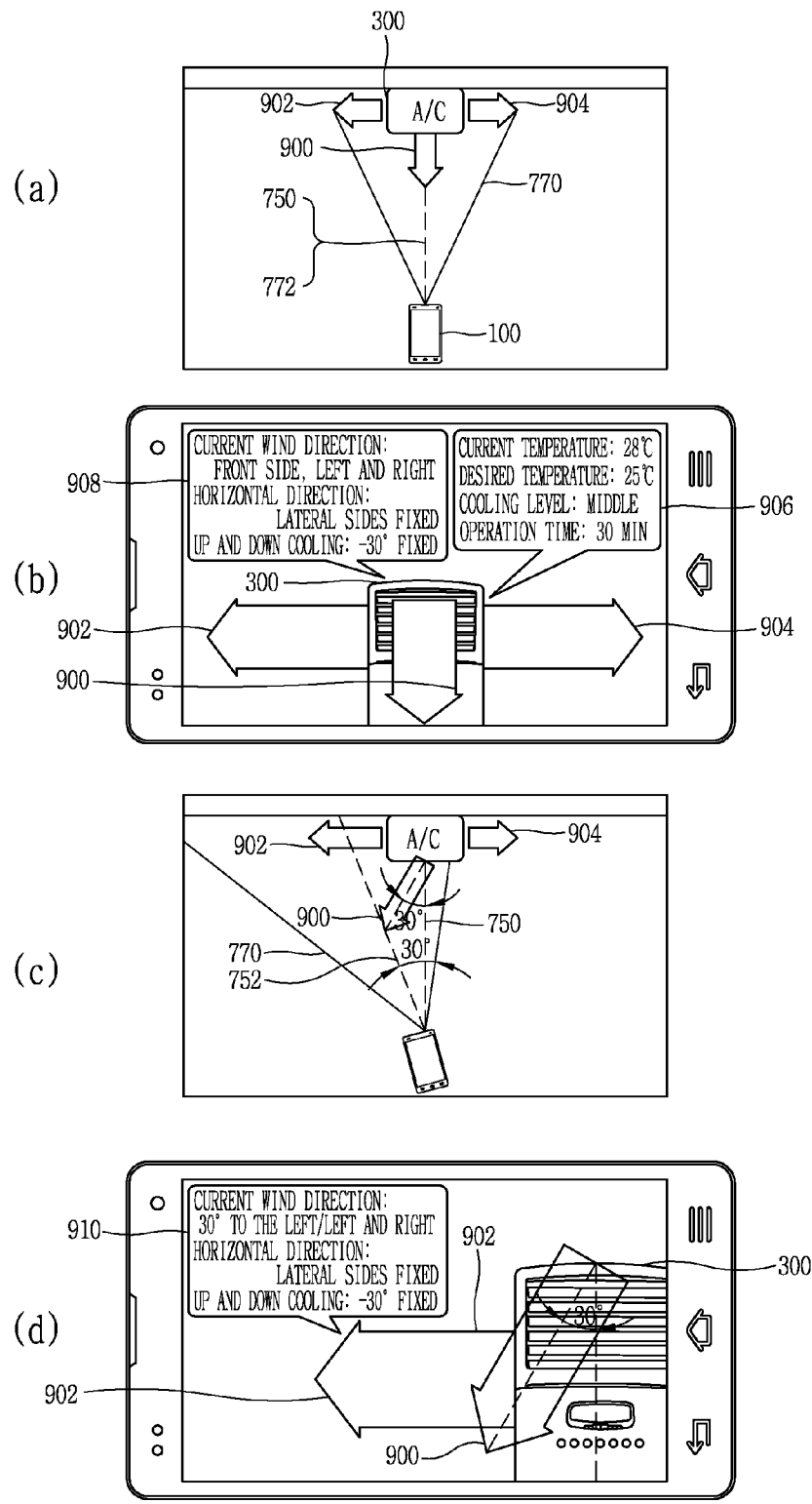
FIGS. 9A to 9D are diagrams for describing another method of adjusting the direction of the wind that are output from the air conditioner, through the augmented reality in the mobile terminal according to one embodiment of the present invention.

FIGS. 9(*a*) to 9(*d*) are diagrams illustrating an example of this. Referring to FIGS. 9(*a*) to 9(*d*), if the air conditioner 300 is included within the viewing angle of the camera 121 of the mobile terminal 100 as illustrated in FIG. 9(*a*), the mobile terminal 100 and the air conditioner 300 are paired for wireless connection.

In this case, the augmented reality image, as illustrated in FIG. 9(*b*), is displayed on the display unit 151 of the mobile terminal 100, along with an image of the air conditioner 300. As described above, the augmented reality image includes a graphic object 906 for indicating the operation state of the air conditioner 300 and a graphic object 908 for indicating the drive state of the air conditioner 300. Then, the augmented reality image includes multiple graphic objects 900, 902, and 904 that correspond to the winds that are output from the outlet grille of the air conditioner 300, respectively.

If the mobile terminal 100 rotates by a predetermined angle (for example, an angle of 30 degrees) in this state as illustrated in FIG. 9(*c*), this rotation angle is detected by the air conditioner 300 or the mobile terminal 100. For example, the rotation angle is detected by reception of a wireless signal that is output from the mobile terminal 100, a change in the receiving direction of the wireless signal, or the like. In addition, the rotation angle is detected through the sensing unit, such as a gyroscope, which is provided in the mobile terminal 100, or through software. In addition, the rotation angle may be obtained from an image with the conditioner 300 serving as the reference.

If the rotation angle is calculated in this manner, the controller 180 determines the direction of the wind that is to be changed according to the rotation angle. For example, if the rotation angle is 30 degrees to the left, the wind direction is determined to be changed by an angle of 30 degrees to the right. This is because the air conditioner 300 and the mobile terminal 100 face each other.

When the change direction of the wind is determined in this manner, the controller 180 transmits the control signal for changing the wind direction of the air conditioner 300. For example, the controller 180 may transmit to the air conditioner 300 the information on the direction corresponding to the rotation angle or may transmit the control signal for directly changing the direction of the wind from the air conditioner 300 to a specific direction.

Accordingly, the direction of a wind 900 that is output from the front outlet grille of the air conditioner 300 is changed corresponding to the rotation angle of the mobile terminal 100 as illustrated in FIG. 9(*c*). Then, the augmented reality image that is output to the display unit 151 of the mobile terminal 100 reflects the change in the wind direction and thus is changed. That is, as illustrated in FIG. 9(*c*), the direction of the graphic object corresponding to the wind that is output from the front outlet grille of the air conditioner 300 is changed by an angle of 30 degrees to the left and thus is displayed on the augmented reality image. In addition, a graphic object 910 for indicating the drive state of the air conditioner 300 includes the information on the changed wind direction as well.

On the other hand, only the case where the air conditioner 300 is included with the viewing angle of the camera 121 of the mobile terminal 100 is described above as an example, but even though the air conditioner 300 is not included within the viewing angle of the camera 121, of course, the state information on the air conditioner 300 is continuously displayed according to the user selection.

Figure 10:
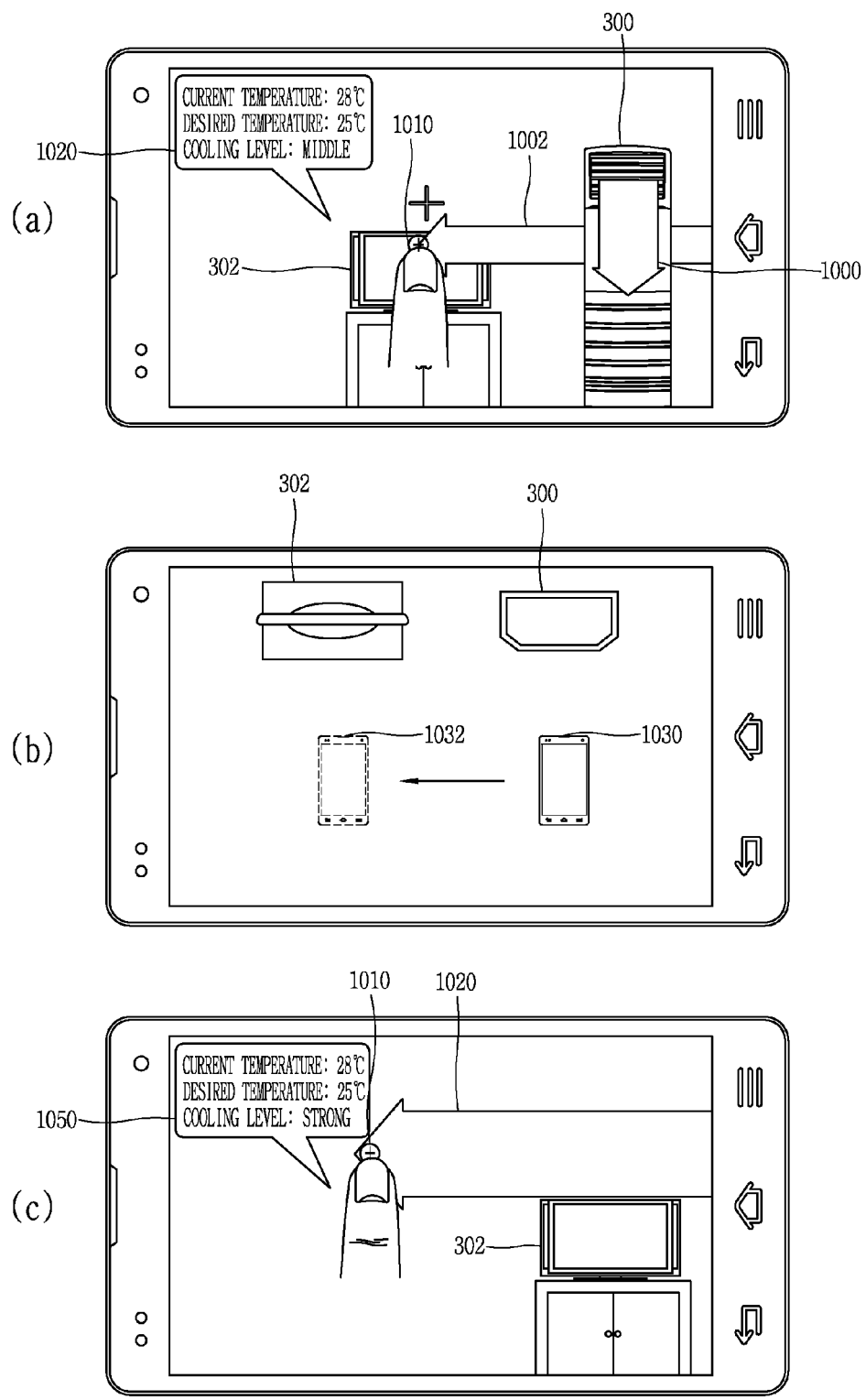
FIGS. 10A to 10C are diagrams for describing a method of displaying state information on the air conditioner although the air conditioner disappears from a viewing angle of a camera in the mobile terminal according to one embodiment of the present invention.

FIGS. 10(*a*) to 10(*c*) illustrates an example of this. FIG. 10(*a*) illustrates an example of displaying the state information on the air conditioner 300 as the augmented reality image. The augmented reality image includes graphic objects 1000, 1002, and 1004 that correspond to the winds that are output from the outlet grilles of the air conditioner 300, respectively.

In this case, if a touch 1010 is applied to the region on which the state information on the air conditioner 300 is displayed, the controller 180 detects this application of the touch 1010. Then, if a position 1030 of the mobile terminal, as illustrated in FIG. 10(*b*), is changed (1032) in a state where the user touch is detected, the image of the air conditioner 300 is not displayed on the display unit 151 of the mobile terminal 100 as illustrated in FIG. 10(*c*). This is because the air conditioner 300 is out of the viewing angle of the camera 121.

However, in this case, as illustrated in FIG. 10(*c*), when the user touch input is continuously applied (1010), the augmented reality image that indicates the state information on the air conditioner 300, a graphic object 1001, is still displayed on at least one region of the display unit 151 even though the air conditioner 300 is not displayed. Furthermore, if the user touch input is continuously applied, the controller 180 detects this and may change the operation state of the air conditioner 300 according to the user touch input.

That is, as illustrated in FIG. 10(b), although the position of the mobile terminal is moved, if the user touch input is continuously applied (1010), the controller 180 determines that a length of the graphic image 1002 corresponding to the touch input is increased as much as the position of the mobile terminal 100 is changed. Therefore, the controller 180 transmits to the air conditioner 300 the control signal for changing the state of the air conditioner 300 in such a manner as to correspond to a length of the graphic object as much as the length is increased.

For example, if the increasing of the length of the graphic object 1002 increases the force of the wind that corresponds to the graphic object, the controller 180 transmits to the air conditioner 300 the control signal for increasing the force of the wind to the force corresponding to the increased length. Then, the force of the wind corresponding to the graphic object 1002, that is, the force of the wind that is output from the left lateral grille of the air conditioner 300 is accordingly increased. Then, as illustrated in FIG. 10(c), the changed state is reflected in a graphic object 1050 for indicating the operation state of the air conditioner 300 as illustrated in FIG. 10(c).

The example in which among the winds that are output from the air conditioner 300, one wind is controlled corresponding to the user touch input is described above. However, of course, not one wind, all the winds that are output from the air conditioner 300 can be also controlled according to the user touch input.

On the other hand, the example in which one mobile terminal according to the embodiment of the present invention controls one air conditioner through the augmented reality is described above. However, of course, the multiple mobile terminals according to the embodiment of the present invention can also control one air conditioner through the augmented reality.

FIGS. 11(a) to 11(d) are diagrams for describing a method in which the multiple mobile terminals according to one embodiment of the present invention control the air conditioner through the augmented reality.

Figure 11:
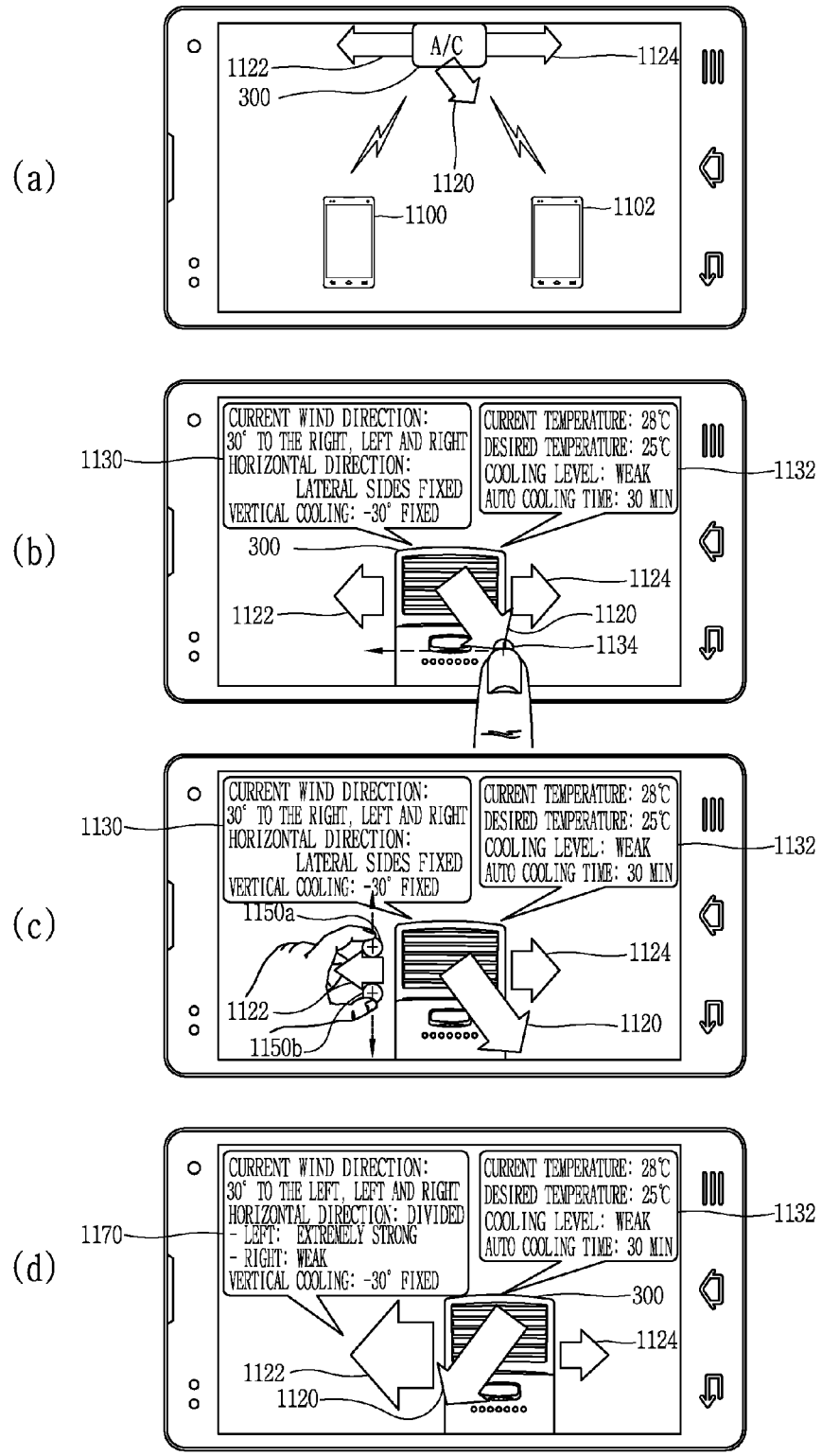
FIGS. 11A to 11D are diagrams for describing a method in which the multiple mobile terminals according to one embodiment of the present invention control the air conditioner through the augmented reality.

Referring to FIGS. 11(a) to 11(d), as illustrated in FIG. 11(a), if the air conditioner 300 is present within a given region or within a given distance, each of the multiple mobile terminals 1100 and 1102 according to the embodiment of the present invention have access to the air conditioner 300. In this case, the state information on the air conditioner 300 is output, as the augmented reality image, to each display unit of the mobile terminals 1100 and 1102. That is, graphic images 1132 and 1130 for indicating the information on the operation state of the air conditioner 300 and the information on the drive state of the air conditioner 300 and graphic images 1120, 1122, and 1124 for indicating the winds that are output from the air conditioner 300 are displayed in the vicinity of the image of the air conditioner 300 on each display unit of the mobile terminals 1100 and 1102.

In addition, of course, each of the mobile terminals 1100 and 1102 according to the embodiment of the present invention controls the air conditioner 300, corresponding to the user touch input applied to the region on which the augmented reality image relating to the air conditioner 300 that is output to its display unit is displayed. FIGS. 11(b) to 11(d) are diagrams illustrating an example of this.

FIG. 11(b) is a diagram illustrating an example in which a screen is output to the display unit of the mobile terminal 1100. FIG. 11(c) is a diagram illustrating an example in which a screen is output to the display unit of the mobile terminal 1102.

For example, the controller of the mobile terminal 1100 detects a user input 1134 that is applied to the region on which a graphic image 1120 corresponding to the wind that is output from the front outlet grille of the air conditioner 300 is displayed. In this case, the controller of the mobile terminal 1100 transmits to the air conditioner 300 the control signal for changing the direction of the wind that is output from the front outlet grille, based on the user input of the touch and drag.

In addition, the controller of the mobile terminal 1102 detects user inputs 1150A and 1150B that are applied to the region on which the graphic image 1122 corresponding to the wind that is output from the left lateral outlet grille of the air conditioner 300 is displayed. In this case, the controller of the mobile terminal 1102 transmits to the air conditioner 300 the control signal for changing the force of the wind that is output from the left lateral outlet grille, based on the user input of the pinch-in or pinch-out.

Therefore, in the air conditioner 300, the direction and force of the wind corresponding to the control signal are changed according to the control signal that is input by each of the controller of the mobile terminal 1100 and the controller of the mobile terminal 1102.

For example, if the user touch input is applied as illustrated in FIGS. 11(b) and 11C, the drive state of the air conditioner 300 is changed according to the control signal that is transmitted by each of the controllers of the mobile terminals 1100 and 1102, as illustrated in FIG. 11(d). That is, the direction of the wind that is output from the front outlet grille of the air conditioner 300 is changed by an angle of 30 degreed to the right and by an angle of 30 to the left with respect to the front. Then, the force of the wind that is output from the left lateral outlet grille of the air conditioner 300 is changed to the force corresponding to the user's input that is detected in the mobile terminal 1102. In addition, this change is reflected and thus the text information included in the graphic object indicating the drive state of the air conditioner 300 is also changed.

However, if the multiple mobile terminals control one air conditioner in this manner, when displaying the augmented reality image on their respective display units, of course, the controller of the mobile terminals 1100 and 1102 may display the graphic objects in such a manner that the graphic object, the user input to which is detected, and the graphic object, the user input to which is not detected, are distinguishable from each other.

For example, as illustrated in FIG. 11(b), the controller of the mobile terminal 1100 transmits to the air conditioner 300 a notification that the user input is detected as being applied to the graphic object 1120. Then, the state information on the air conditioner 300 includes information that the user input is applied to the graphic image 1120. Then, the state information is received by the mobile terminal 1102. Then, the controller 180 of the mobile terminal 1102 displays the graphic objects in such a manner that the graphic object 1120, the user input to which is detected in the mobile terminal 1100, is distinguishable from the other graphic objects.

For example, the controller of the mobile terminal 1102 displays the graphic objects in such a manner that the region on which the graphic object 1120 of which the control is selected by the user is displayed is displayed in a different color from those of the other graphic objects. In addition, the controller of the mobile terminal 1102 may display the graphic object 1120 in a highlighting manner. In addition, the region on which the graphic object 1120 is displayed may be displayed in a blinking manner.

In addition, as illustrated in FIG. 11(c), even though the user input is detected as being applied to one, among the graphic objects that are displayed on the display unit of the mobile terminal 1102, as described above, the graphic object, the user input to which is detected, is displayed on the display unit of the mobile terminal 1100 in a manner that distinguishes it from the other graphic objects. Therefore, the controller of the mobile terminal 1100 and the mobile terminal 1102 prevent the user from applying different touch inputs to the same graphic object.

The method in which at least one mobile terminal controls the state of the air conditioner 300 through the augmented reality image is described above. Although only the example in which at least one mobile terminal controls one air conditioner is described above, but of course, one mobile terminal can control the multiple air conditioners. That is, for example, if at least one air conditioner is included within the viewing angle of the mobile terminal, the augmented reality image including all the pieces of information on at least one air conditioner is displayed on the display unit of the mobile terminal. Then, the control signal for controlling at least one air conditioner, corresponding to the touch applied to the region on which the state information is displayed, is transmitted to the corresponding air conditioner.

The augmented reality image that is output to the display unit 151 of the mobile terminal 100 according to the embodiment of the present invention is described below. As described above, the augmented reality image includes the graphic objects corresponding to the information on the operation state of the air conditioner 300, the information on the drive state of the air conditioner 300, and the information on the surrounding environment of the air conditioner 300. In addition, the augmented reality image includes the graphic objects for indicating the forces and directions of the winds that are output from the air conditioner 300.

Figure 12A:
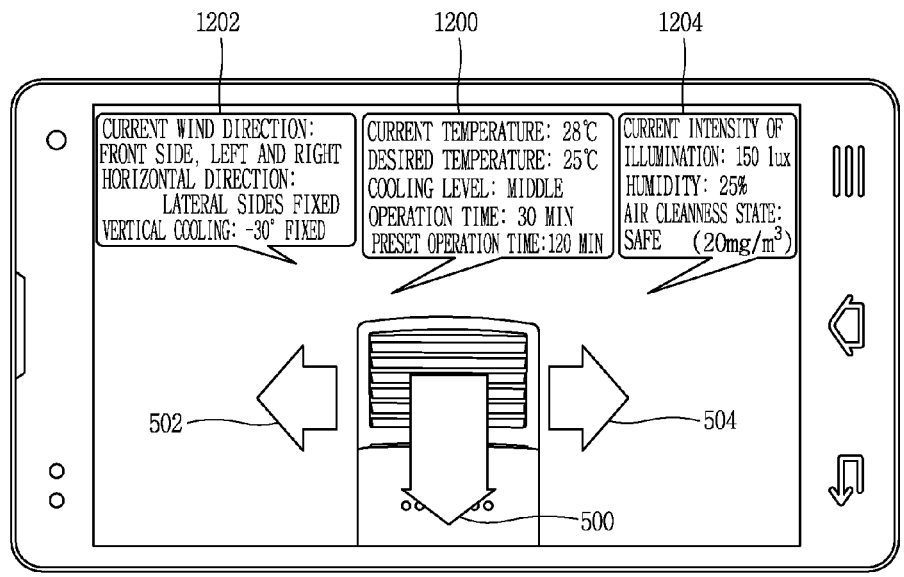
FIGS. 12A, 12B, 12C(a) and 12C(b) are diagrams for describing a method of displaying the state information on the air conditioner through the augmented reality in the mobile terminal according to one embodiment of the present invention.
Figure 12B:
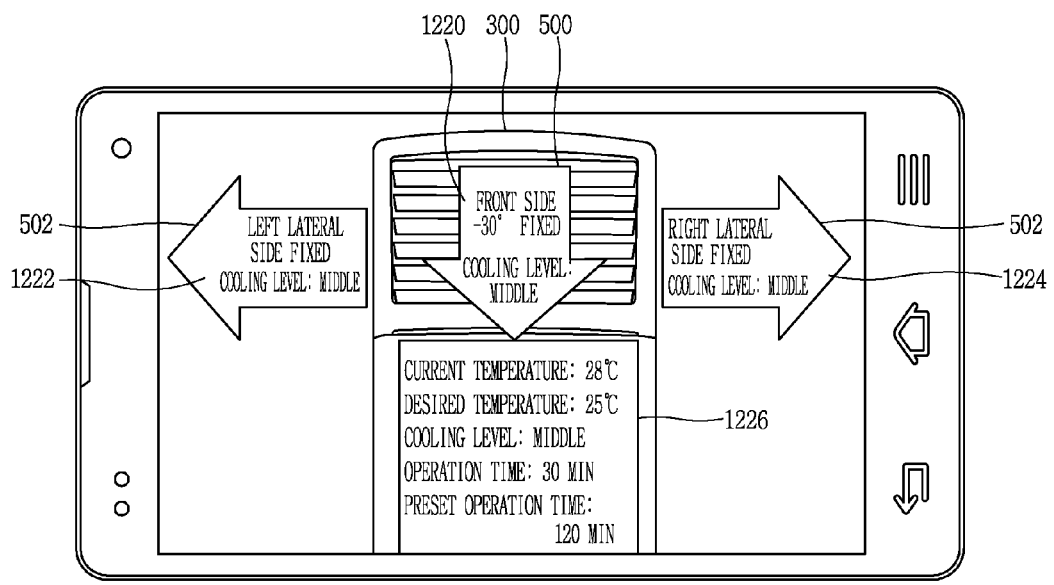
Figure 12C:
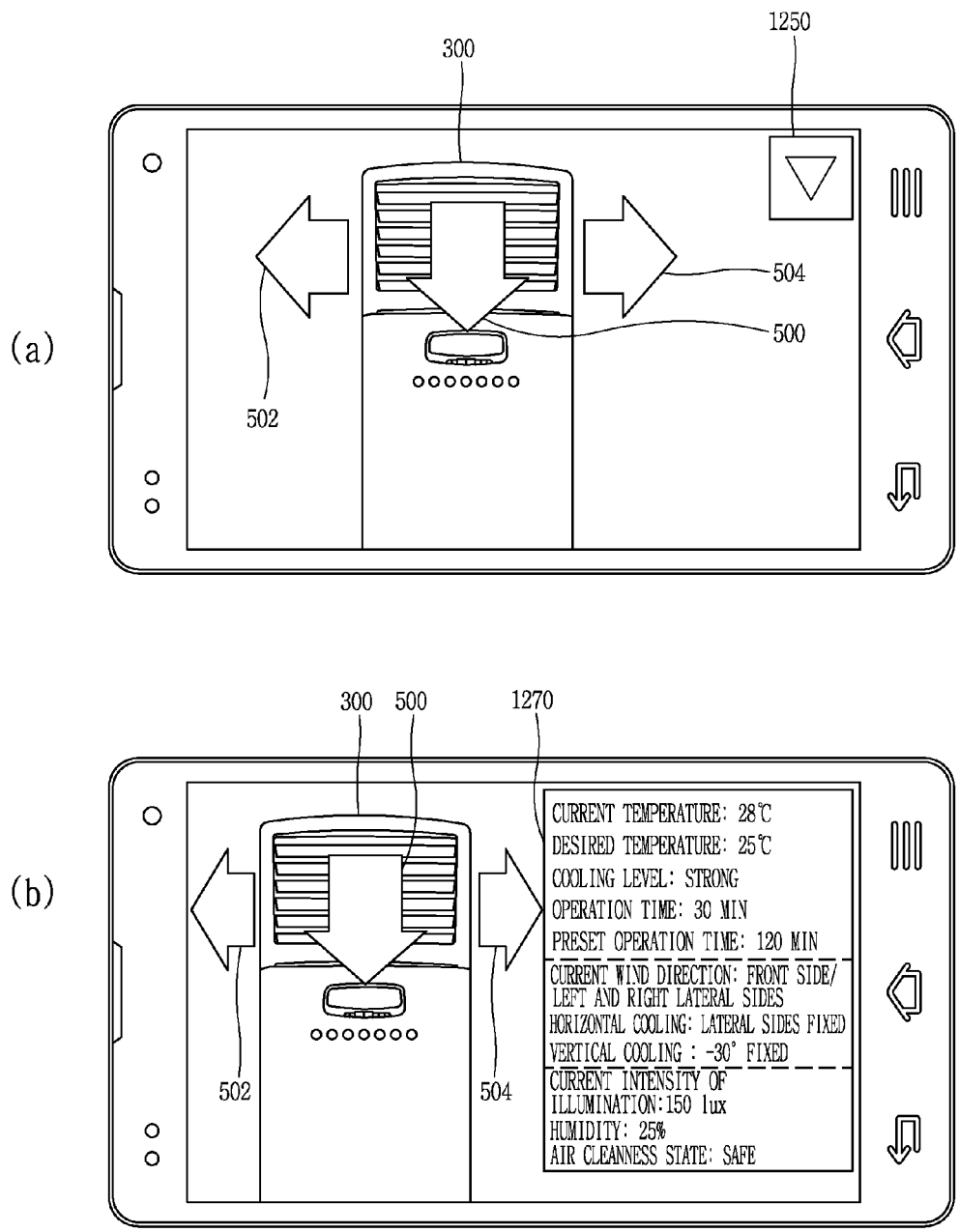

FIGS. 12a, 12b, 12c(a) and 12c(b) illustrate examples of the augmented reality images that are output to the display unit 151 in this manner. For example, the augmented reality image, as illustrated in FIG. 12a, the graphic objects corresponding to the information on the operation state, the information on the drive state, and the information on the surrounding environment of the air conditioner 300, which are included in the augmented reality image, are displaying on at least one region of the display unit 151.

At this point, the graphic object 1200 corresponding to the information on the operation state of the air conditioner 300 includes the current temperature, the desired temperature, the force of the wind that is current set, that is, the extent of cooling, the information on the time that the air conditioner has operated up to now, and the information on the operation time during which the air conditioner will operate. In addition, a graphic object 1202 corresponding to the drive state of the air conditioner 300 includes the information on the direction of the wind that is currently output from each outlet grille of the air conditioner 300, the information on a type of the cooling in the horizontal direction, the information on a type of the cooling in the vertical direction, and the like.

In addition, a graphic object 1204 corresponding to the information on the surrounding environment of the air conditioner 300 includes the information on humidity, intensity of illumination, air cleanness state, or the like. In addition, the graphic images 500, 502, and 504 corresponding to the forces and directions of the winds that are currently output from the outlet grilles of the air conditioner 300, respectively, are displayed in the vicinity of the air conditioner 300.

In addition, of course, the augmented reality image can be output in any ways other than those illustrated in FIG. 12a. For example, the graphic objects that make up the augmented reality image may be displayed in a position in which the information is actually output in the air conditioner 300 or in a position in which the wind is actually output.

Referring to FIG. 12a, the pieces of information on a drive state of the air conditioner 300 are displayed in a position of the wind that is output from each outlet grille of the air conditioner 300. The pieces of information on the drive state may be displayed on the graphic images corresponding to the forces and directions of the winds that are output from each outlet grille, respectively.

For example, text information 1220 on the force and direction of the wind that is output from the front outlet grille and the type of cooling in the vertical direction is displayed on the graphic image 500 corresponding to the wind that is output from the front outlet grille of the air conditioner 300. In addition, pieces of text information 1222 and 1224 on the forces of the winds that are output from the left and right lateral outlet grilles and on the type of cooling in the horizontal direction are displayed on the graphic images 502 and 504 corresponding to the winds that are output from the left and right lateral grilles of the air conditioner 300.

In addition, information 1228 on the operation state of the air conditioner 300, that is, the information that can be output to a display unit of the air conditioner 300, is displayed on a region 1226 of the graphic object corresponding to the air conditioner 300, which corresponds to the region in which the display unit is arranged, Then, the information on the operation state includes the information on the force of the wind that can be output to the maximum from the air conditioner 300, the guide information on the wind direction, or the like.

In addition, of course, the controller 180 may display information other than the outlined information on the state of the air conditioner 300 according to the user selection. For example, as illustrated in FIG. 12c, the controller 180 display on the display unit 151 the augmented reality image including only the graphic objects 500, 502, and 504 corresponding to the winds that are output from the air conditioner 300, respectively. Then, the controller 180 displays a button image 1250 on at least one region of the display unit 151 and thus detects whether the user input is applied to the region on which the button image 1250 is displayed.

Then, only when the user input is applied to the region on which the button image 1250 is displayed, the controller 180 outputs to one region of the display unit 151a screen including the information on the detailed operation state and drive state of the air conditioner 300, and the surrounding environment.

On the other hand, the graphic objects illustrated in FIGS. 12a, 12b, 12c(a) and 12c(b) are displayed as images that differ in shape, appearance, or color according to characteristics of the state information. For example, the arrow images that differ in direction according to the direction of the wind that is output from the air conditioner 300 are displayed on the display unit 151. In addition, the arrow images that differ in thickness according to the force of the wind are displayed. In addition, the arrow images that differ in color according to a temperature of the wind that is output from the air conditioner 300 are displayed.

Figure 13A:
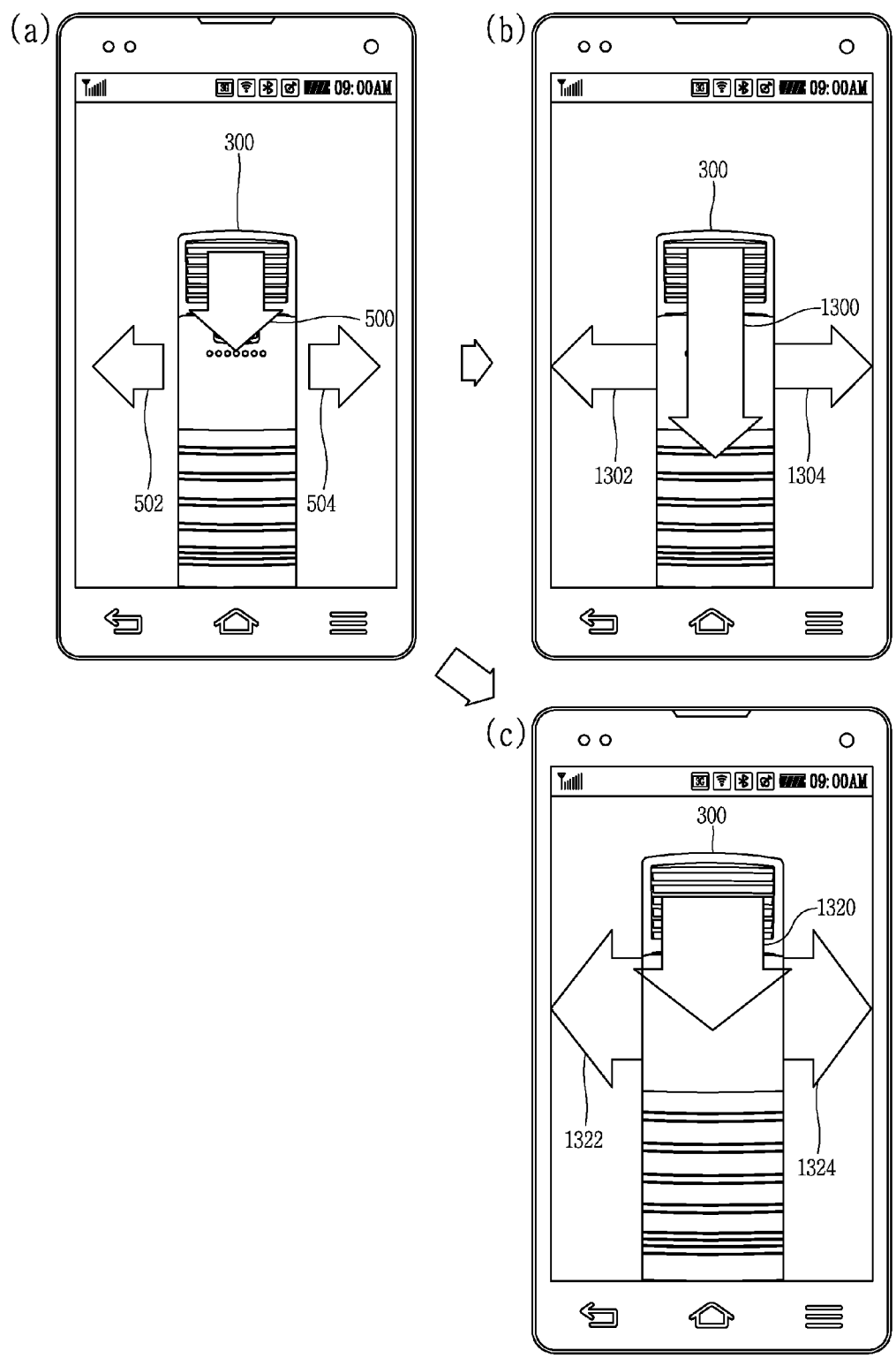
FIGS. 13A(a) to 13A(c), 13B(a) to 13B(d), and 13C(a) and 13C(b) are diagrams for describing a method of displaying information relating to the wind that is output from the air conditioner, in the mobile terminal according to one embodiment of the present invention.

FIGS. 13a(a) to 13c(c), 13b(a) to 13b(d), and 13c(a) and 13c(b) are diagrams for describing a method in which the information relating to the wind that is output from the air conditioner is displayed, through the augmented reality, on the mobile terminal according to one embodiment of the present invention.

First, FIGS. 13a(a) to 13c(c) are for describing a method in which the force of the wind that is output from the air conditioner 300 is displayed through the graphic image. For example, if the force of the wind that is output from the air conditioner 300 is weak (if the fore of the wind is at the third level in the case where the force of the wind is categorized into three levels: strong, middle, and weak), the graphic images 500, 502, and 504 illustrated in FIG. 13a(a) are output on the display unit 151 in such a manner that they correspond to the winds that are output from the output grille, respectively.

At this point, as illustrated in FIG. 13a(a), the arrow image displayed in the vicinity of each outlet grille of the air conditioner 300 correspond to the force of the wind that is output from each outlet grille. Then, in this case, the arrow image indicates the information on the force of the wind that is changed to a different force according to the thickness and length of the arrow image.

That is, the arrow images differ in thickness and length according to the force of the wind that is output from each outlet grille. For example, if the force of the wind that is output from the air conditioner 300 is changed from "weak" to "strong," the arrow image is changed in such a manner as to correspond to the changed force of the wind.

FIGS. 13a(b) and 13a(c) illustrates an example of this. FIG. 13a(b) illustrates the force of the wind using the length of the arrow image. FIG. 13a(c) illustrates the force of the wind using the thickness of the arrow image. For example, corresponding to the user's input applied to one among the graphic objects 500, 502, and 504, the controller 180 displays the graphic object corresponding to the force (for example, "strong") of the wind that is determined by the user input, on at least one among the regions on which the graphic objects 500, 502, and 504 are displayed.

For example, as illustrated in FIG. 13a(b), the controller 180 instead displays arrow images 1300, 1302, and 1304 that have the length corresponding to the force "strong" of the wind," on the region on which the graphic objects 500, 502, and 504 are displayed. In addition, as illustrated in FIG. 13a(c), the controller 180 instead displays arrow images 1320, 1322, and 1324 that have the thickness corresponding to the force "strong" of the wind," on the region on which the graphic objects 500, 502, and 504 are displayed. Accordingly, the graphic images corresponding to the forces of the winds that are currently set in the air conditioner 300 are displayed, as the augmented reality images, on the display unit 151, and the user can intuitively recognize the force of the wind through the augmented reality images.

Figure 13B:
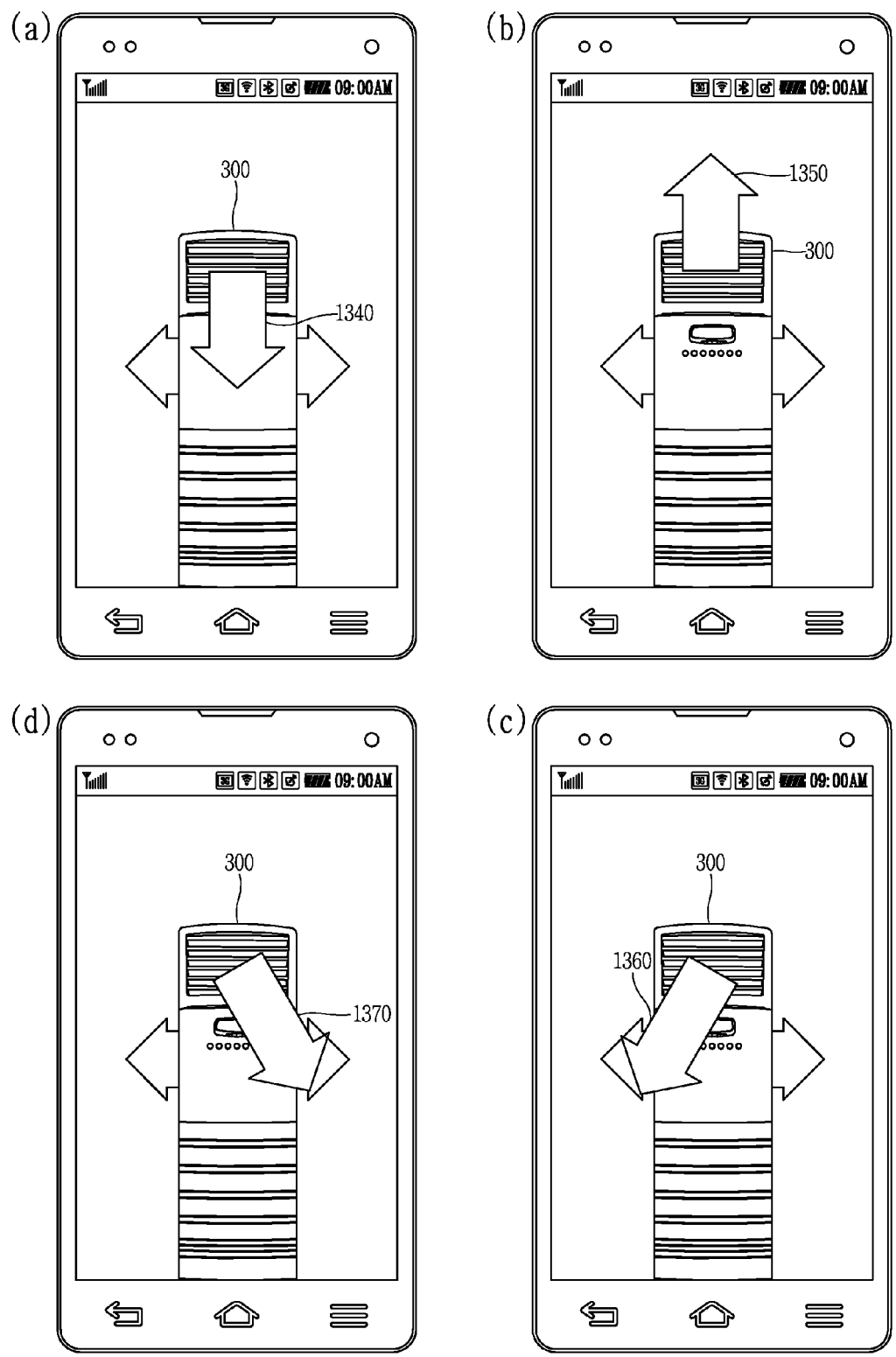

In addition, the direction of the wind, as well as the force of the wind, is displayed as images that differ in shape, appearance, and color. FIGS. 13b(a) to 13b(b) illustrate an example of this.

FIGS. 13b(a) and 13b(b) illustrate an example of the graphic image indicating the vertical direction of the wind that is output from the front outlet grille of the air conditioner 300. For example, if the direction of the wind that is output from the front outlet grille of the air conditioner 300 is inclined by a predetermined angle (for example, 30 degrees upward or 30 degrees downward) with respect to the horizontal state, the direction of the graphic object corresponding to the wind that is output at the predetermined angle, that is, the direction of the arrow image is changed.

For example, if the predetermined angle is 30 degrees downward, the graphic object corresponding to the wind that is output from the front outlet grille of the air conditioner 300 is a graphic image 1340 that faces downward as illustrated in FIG. 13b(a). For example, if the predetermined angle is 30 degrees upward, the graphic object corresponding to the wind that is output from the front outlet grille of the air conditioner 300 is a graphic image 2350 that faces upward as illustrated in FIG. 13b(b). At this point, of course, the arrow image corresponding to the wind that is output from the front outlet grille is displayed, as a three-dimensional image, in the three-dimensional form that is determined according to the predetermined angle.

For example, assume that predetermined angle is 30 degrees downward and the arrow image 1340 in FIG. 13b(a) is displayed. Then, if the predetermined angle is 60 degrees downward, the arrow image 1340 is displayed in the form of the three-dimensional image that faces more downward by an angle of 30 degrees with respect to the horizontal state than the arrow image 1340 illustrated in FIG. 13b(a).

In addition, of course, the same is true for a case where the predetermined angle is in the upward direction. For example, assume that predetermined angle is 30 degrees upward and the arrow image 1350 in FIG. 13b(b) is displayed. Then, if the predetermined angle is 60 degrees upward, the arrow image 1350 is displayed in the form of the three-dimensional image that is rotated more upward by an angle of 30 degrees with respect to the front outlet grille of the air conditioner 300.

Furthermore, the arrow images that differ according to the horizontal direction of the wind may be displayed. FIGS. 13b(c) and 13b(d) illustrate an example of this.

For example, the direction of the wind that is output from the front outlet grille of the air conditioner 300 is inclined by the predetermined angle (for example, 30 degrees to the left) with respect to the front, the graphic object indicating the direction corresponding to the predetermined angle is output to the display unit 151, corresponding to the wind that is output from the front outlet grille. That is, as illustrated in FIG. 13b(c), an arrow image 1360 in the direction corresponding to the predetermined angle is displayed, as the graphic object corresponding to the wind that is output from the front outlet grille, on the display unit 151.

In addition, if the predetermined angle is 30 degrees to the right, as illustrated in FIG. 13b(d), an arrow image 1370 in the direction corresponding to 30 degrees in the rightward direction is displayed, as the graphic object corresponding to the wind that is output from the front outlet grille, on the display unit 151.

Furthermore, of course, the graphic objects that differ according to a temperature (for example, a difference between the desired temperature and the ambient temperature) of the wind that is output from the air conditioner 300 or the ambient temperature may be displayed on a position corresponding to the wind that is output from the air conditioner 300.

For example, the wind that is output from the air conditioner 300 is displayed as the graphic object that has a color corresponding to the temperature that is currently detected in the air conditioner 300. Then, if an indoor temperature is lowered due to a cooling effect accomplished by the air conditioner 300, the graphic object is changed to a graphic object that has the color corresponding to a change in temperature.

Figure 13C:
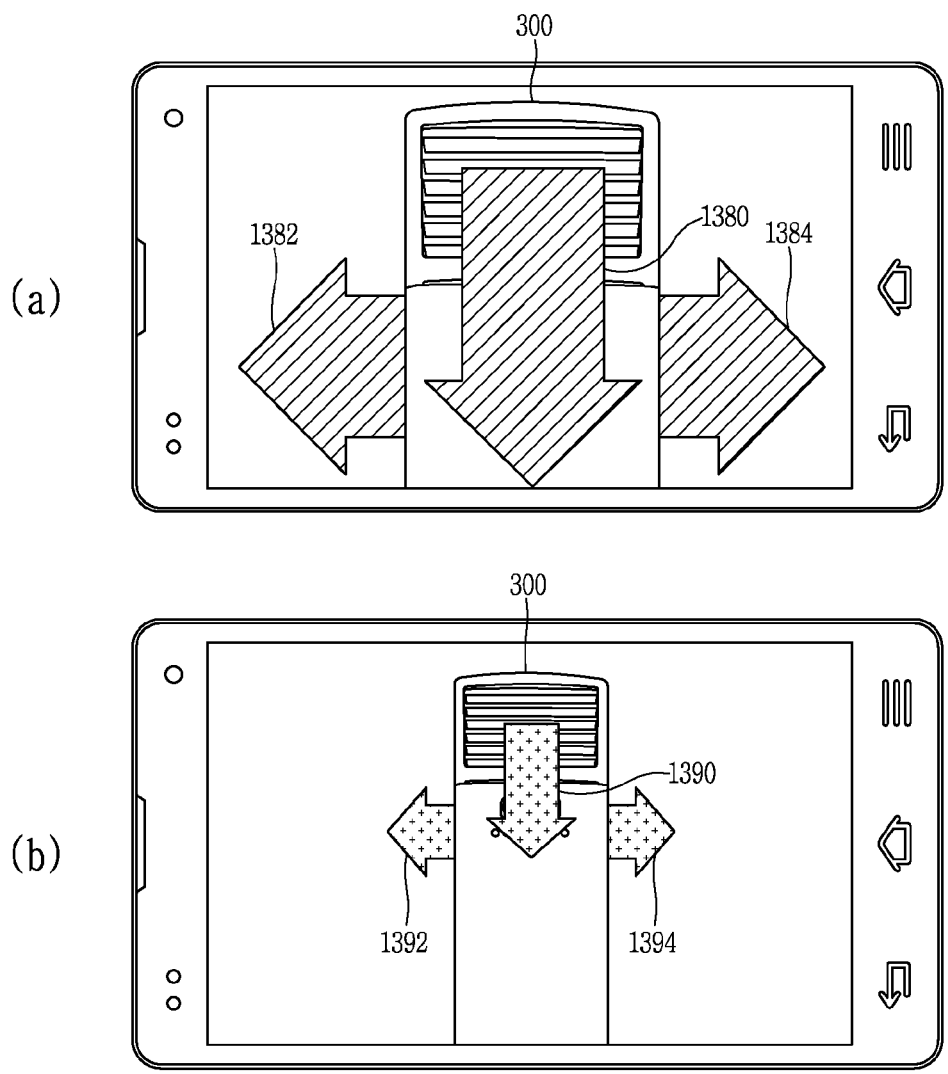

FIGS. 13c(a) and 13c(b) illustrate an example of this. For example, if in the case of driving the air conditioner 300, there is a big difference between the ambient temperature and the desired temperature that is set by the user, the temperature of the wind that is output from the air conditioner 300 may be too low (for example, 3° C.). However, as the air conditioner 300 operates in the cooling mode, the difference between the ambient temperature and the desired temperature that is set by the user is reduced. Accordingly, the temperature of the wind that is output from the air conditioner 300 is somewhat raised (for example, 7° C.).

In this case, the controller 180 displays the graphic objects that differ in color according to the temperature of the wind that is output from the air conditioner 300, in such a manner to correspond to the winds that are output from the air conditioner 300. For example, if the temperature of the wind that is output from the air conditioner 300 is 3° C., arrow images 1380, 1382, and 1384 corresponding to the winds that are output from the outlet grilles of the air conditioner 300, respectively, are displayed in a predetermined first color (for example, blue) as illustrated in FIG. 13*c*(*a*).

Then, if the temperature of the wind that is output from the air conditioner 300 is 7° C., the arrow images in the vicinity of, 1392, and 1394 corresponding to the winds that are output from the outlet grilles of the air conditioner 300, respectively, are displayed in a predetermined second color (for example, yellow) as illustrated in FIG. 13*c*(*b*).

In addition, the controller 180 may display the arrow images 1380, 1382, 1384, 1390, 1392, and 1394 according to the detected ambient temperature instead of the temperature of the wind that is output from the air conditioner 300.

For example, in the case of the temperature (for example, 30° C.) that is detected when operating the air conditioner 300 for the first time, the controller 180 displays the arrow images 1380, 1382, and 1384 in a predetermined third color (for example, red-yellow). In addition, in the case of the temperature (for example, 25° C.) that is detected a predetermined time after operating the air conditioner 300, the controller 180 displays the arrow images 1390, 1392, and 1394 in a predetermined fourth color (for example, green).

The example is described above in which the mobile terminal 100 generates the graphic objects corresponding to the information on the operation state of the air conditioner 300, the information on the drive state of the air conditioner 300, and the information on the surrounding environment of the air conditioner 300, and the graphic objects for indicating the forces and directions of the winds that are output from the air conditioner 300 and displays the generated graphic objects as the augmented reality. However, in another case, of course, the air conditioner 300 may directly generate the graphic objects and transmit the generated objects to the mobile terminal 100.

For example, if the external device is detected, such as the mobile terminal 100, the air conditioner 300 may transmit to the external device the graphic objects reflecting the state information on the air conditioner 300. In this case, of course, the mobile terminal 100 may receive the graphic objects and display the received graphic objects on the display unit 151, along with the image of the air conditioner 300.

The method is described above in which the user controls the air conditioner 300 through the augmented reality image, but in another case, of course, the air conditioner 300 can be automatically set according to setting information including at least one or more predetermined setting values. A method in which the air conditioner 300 is controlled using the setting information is described below.

Figure 14A:
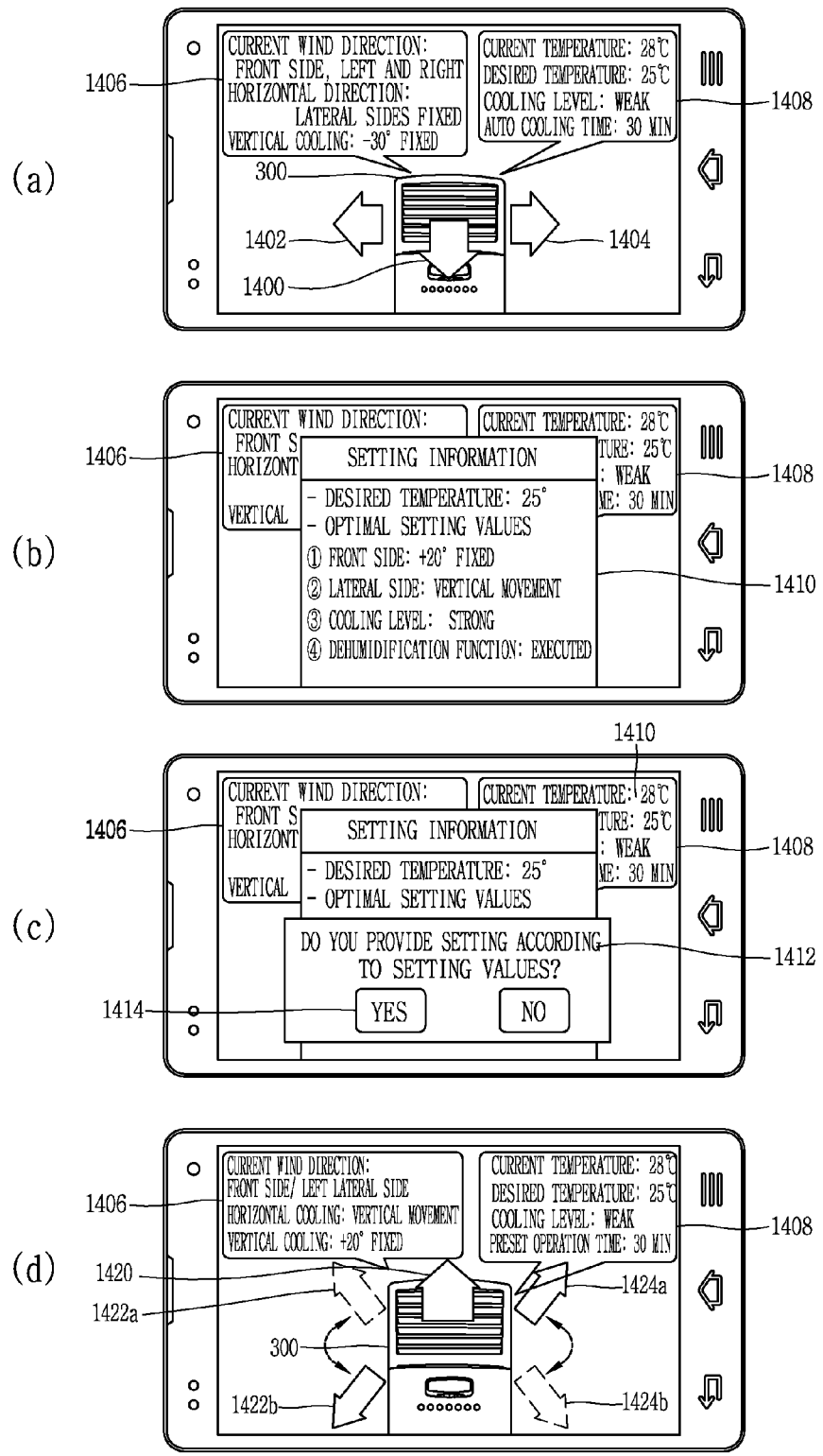
FIGS. 14A(a) to 14A(d), 14B(a) to 14B(d), and 14C(a) to 14C(d) are diagrams for describing a method of controlling operation state of the air conditioner through a setting value that is preset in the mobile terminal according to one embodiment of the present invention.

FIGS. 14*a*(*a*) to 14*a*(*d*), 14*b*(*a*) to 14*b*(*d*), and 14*c*(*a*) to 14*c*(*d*) are diagrams for describing a method of controlling operation state of the air conditioner through a setting value that is preset in the mobile terminal according to one embodiment of the present invention.

First, referring to FIGS. 14*a*(*a*) to 14*a*(*d*), when having access to one air conditioner 300, the mobile terminal 100 according to the embodiment of the present invention displays the state information on the air conditioner 300 on the display unit 151 through the augmented reality image as illustrated in FIG. 14*a*(*a*).

In this case, the controller 180 receives at least one piece of setting information, based on the user selection. For example, if the current state information on the air conditioner 300 is different from setting information on already-stored optimal state, the controller 180 may output alarm information that the setting information on the optimal state is present. Then, the controller 180 receives the setting information, corresponding to the user selection of the alarm information.

The setting information here refers to information including at least one setting value for the operation state or the drive state of the air conditioner 300. Then, the setting information is information on the operation state and the drive state of the air conditioner 300, which are previously set at a specific time.

That is, the information on the state of the air conditioner 300 that are previously set at a specific time and the like are the setting information. For example, the setting information includes a previously-set optimal temperature of the air conditioner 300. In this case, the controller 180 displays the current-state information on the air conditioner 310 and the information on the optimal temperature together. In addition, the setting information is information including the setting value for the air conditioner 300, which is necessary for adjusting to the optimal temperature. The setting information may be state information on the air conditioner 300, which is preset according to a temperature that is predetermined by a manufacturer of the air conditioner 300 or a specific company.

The setting information (or the setting information on the optimal state) is stored in the memory 160 of the mobile terminal 100 or is stored in the air conditioner 300. In addition, the setting information may be stored in an external server (for example, a cloud server) or the like.

The controller 180 outputs at least one piece of setting information to at least one region of the display unit 151, based on the user selection. For example, the controller 180 receives at least one piece of setting information corresponding to the user selection from the air conditioner 300 or the external serve and outputs one piece of setting information, among the multiple pieces of setting information, which corresponds to the user selection, to at least one region of the display unit 151. FIG. 14*a*(*b*) illustrates an example of a screen 1410 to which one piece of setting information is output in this manner.

In this case, the controller 180 receives from the user confirmation that the air conditioner 300 is controlled according to the setting information corresponding to the screen that is currently output to the display unit 151. To do this, the controller 180 outputs a separate graphic object 1412 for receiving the confirmation from the user to at least one region of the display unit 151.

For example, as illustrated in FIG. 14*a*(*c*), the separate graphic object 1412 includes at least one button image for receiving the confirmation from the user. Then, if among the button images, the user input is detected as being applied to a region on which a button image (for example, a "YES" button image 1414) for allowing the state of the air conditioner 300 to be controlled according to the setting information is displayed, the controller 180 transmits to the air conditioner 300 the control signal for controlling the air conditioner 300, based on the setting value included in the setting information corresponding to the screen that is currently output to the display unit 151.

Accordingly, the drive state or the operation state of the air conditioner 300 is changed. That is, as illustrated in FIG. 14*a*(*d*), the direction of the wind that is output from the front outlet grille of the air conditioner 300 is changed to an angle of 20 degrees in the upward direction, and the directions of the winds that are output from the left and right lateral outlet grilles are vertically changed. In addition, the forces of the winds that are output from the outlet grilles of the air conditioner 300 are changed according to the setting value included in the setting information.

On the other hand, of course, at least one setting value, among the multiple setting values included in the setting information, may be selected by the user.

Figure 14B:
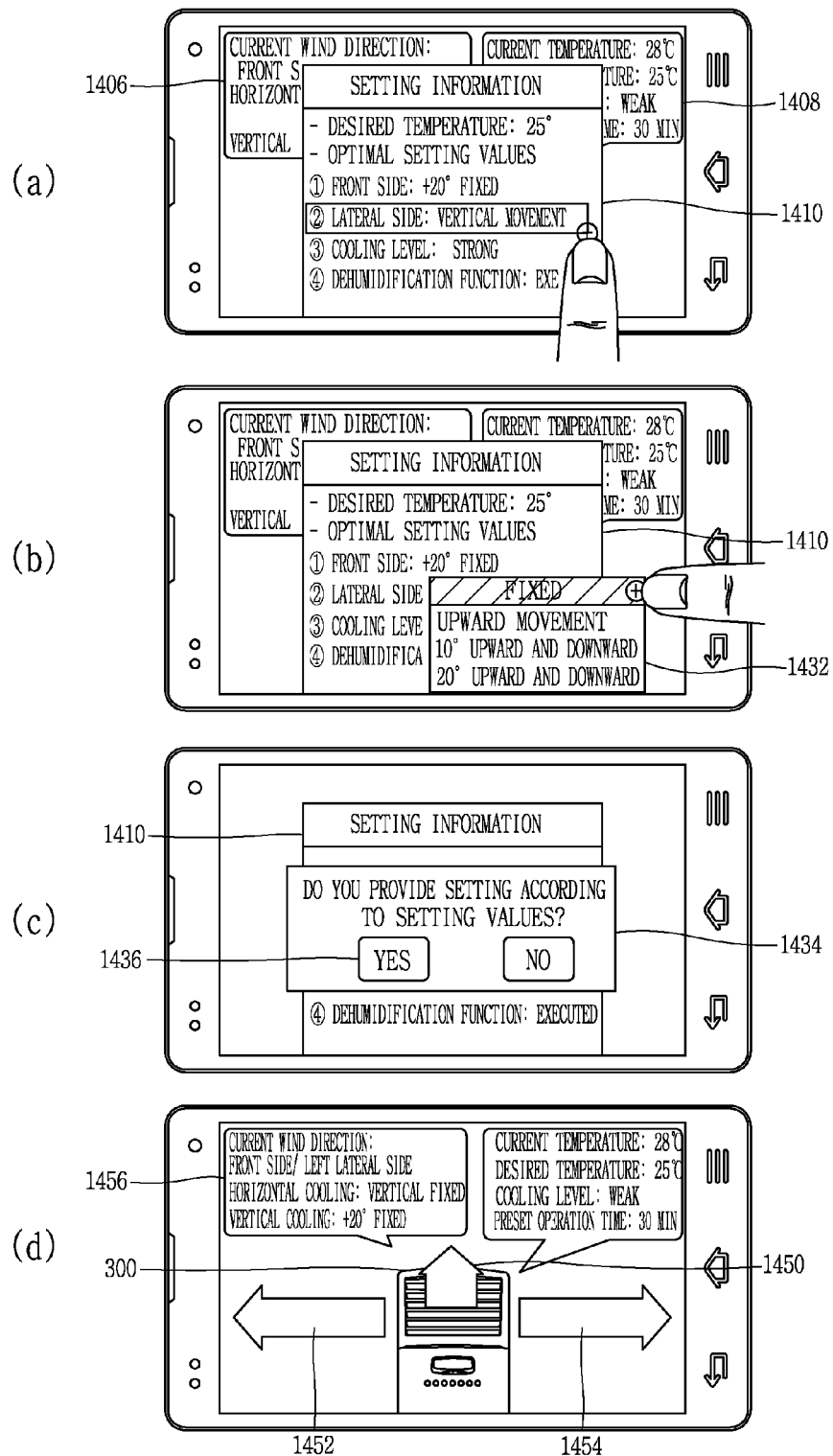

FIGS. 14b(a) to 14b(d) illustrate an example of this. For example, as illustrated in FIG. 14a(b), if the user touch is detected as being applied to the region on which a specific setting value is displayed, the controller 180 recognizes that only one setting value (for example, the setting value for the winds that are output from the left and right lateral outlet grilles) corresponding to the touch input is selected by the user.

In this case, the controller 180 provides the user with various selection items for one setting value selected by the user. For example, the controller 180 outputs to at least one region of the display unit 151a menu screen including at least one or more items of setting that are selectable by the user, with respect to one setting value selected by the user.

FIG. 14b(b) illustrates an example of this. Then, as illustrated in FIG. 14b(a) to 14b(d), among the output types of the winds that are output from the left and right lateral outlet grilles of the air conditioner 300, the controller 180 outputs the screen including at least one output type, as the menu screen, to at least one region of the display unit 151.

In this case, as illustrated in FIG. 14b(c), the controller 180 outputs to at least one region of the display unit 151a separate graphic object 1434 for receiving the confirmation from the user. Then, the separate graphic object 1434 includes a button image (for example, a "YES" button image 1436) that allows the state of the air conditioner 300 to be controlled according to one setting value selected by the user.

Then, if the user input is detected as being applied to a region on which the button image 1436 is displayed, the controller 180 transmits to the air conditioner 300 the control signal for controlling the air conditioner 300, based on one setting value selected by the user.

For example, among the setting values included in the setting information, the controller 180 transmits to the air conditioner 300 only the control signal corresponding to the setting value for the wind that is output from the left and right lateral outlet grilles of the air conditioner 300. Accordingly, cooling types of the winds that are output from the left and right lateral outlet grilles are changed from a horizontal cooling type (a "lateral" setting value in FIG. 14b(a)) to a fixed cooling type.

Then, the mobile terminal 100 receives the changed state information on the air conditioner 300. Then, as illustrated in FIG. 14b(d), the controller 180 outputs to the display unit 151 the augmented reality image that includes graphic objects 1456 and 1454 reflecting the changed operation state of the air conditioner 300, according to the received state information.

On the other hand, of course, the setting information may be displayed, in the form of a guide image, on the display unit 151. FIGS. 14c(a) to 14c(d) illustrate an example of this.

First, referring to FIGS. 14c(a) to 14c(d), when having access to one air conditioner 300, the mobile terminal 100 according to the embodiment of the present invention displays the state information on the air conditioner 300 on the display unit 151 through the augmented reality image as illustrated in FIG. 14c(a).

Then, the controller 180 receives at least one piece of setting information, based on the user selection. Then, the controller 180 generates the guide images corresponding to at least one or more setting values included in one piece of setting information, according to the user selection of at least one piece of setting information after receiving as least one piece of setting information and displays the generated guide images on the display unit 151.

That is, as illustrated in FIGS. 14b(a) to 14b(d), the controller 180 displays at least one guide image on the augmented reality image that is displayed on the display unit 151. For example, if the setting information corresponding to the screen illustrated in FIG. 14a(b) is received, the controller 180 generates the arrow image, in which the direction of the wind is inclined by an angle of 20 degrees upward, as a guide image 1460 corresponding to the wind that is output from the front outlet grille of the air conditioner 300. In addition, the controller 180 generates the arrow images in which the cooling type is set to a vertical movement, as guide images 1462A, 1462B, 1464A, and 1464B that correspond to the winds that are output from the left and right lateral outlet grilles of the air conditioner 300.

The guide images 1460, 1462A, 1462B, and 1464A are displayed in a manner that distinguishes them the other graphic objects. For example, as illustrated in FIG. 14c(b), the guide images may be displayed in the form of a dotted line and may be displayed in different colors. In addition, the guide images are displayed in such colors that they are distinguishable from the other graphic objects. In addition, the guide image may be displayed as the blinking graphic object.

In this case, as illustrated in FIG. 14c(c), the controller 180 outputs to at least one region of the display unit 151 the separate graphic object 1412 for receiving the confirmation from the user. Then, the separate graphic object 1412 includes the button image (for example, the "YES" button image 1414) that allows the state of the air conditioner 300 to be controlled based on the setting information that is currently output to the screen.

Then, if the user input is detected as being applied to the region on which the button image 1414 is displayed, the controller 180 transmits to the air conditioner 300 the control signal for controlling the air conditioner 300, based on the setting information that is currently output to the screen.

In another case, the controller 180 detects which one of the graphic objects 500, 502 and 504 displayed on the display unit 151 the user input is applied to. For example, as illustrated in FIG. 14c(d), if a user touch input 1470 is detected as being applied to the region on which the arrow image 504 is displayed, the controller 180 recognizes that the drive state of the air conditioner 300 corresponding to the graphic object 504 is selected by the user.

Then, the controller 180 detects whether or not the user input is applied to the guide image 1460 corresponding to the graphic object 504 that is currently selected by the user. For example, the controller 180 detects whether the user touch input that is detected as being applied to the graphic object 504 is dragged to the region on which the guide image 1460 is displayed. Then, as illustrated in FIG. 14c(d), if a user drag input 1480 is detected as being applied to the region on which the guide image 1460 is displayed, the controller 180 transmits to the air conditioner 300 the control signal for changing the drive state of the air conditioner 300 corresponding to the graphic object 504 according to the setting value corresponding to the guide image 1460.

Accordingly, the control signal for changing the direction of the wind that is output from the front outlet grille, to an angle of 20 degrees in the upward direction (for example, "front" setting value illustrated in FIG. 14a(b)) is transmitted to the air conditioner 300. Therefore, the graphic object 1484 for indicating the drive state of the air conditioner 300 includes this change of the direction of the wind. Then, the guide image 1460 is displayed in the form of the graphic object indicating the wind that is actually output. That is, for example, the guide image 1460 is displayed as a solid-line arrow image 1482.

The method in which the state of the air conditioner 300 is set using the predetermined setting information is described in detail above.

A method is described in detail below in which if the mobile terminal 100 enters the augmented reality mode, that is, if the augmented reality (AR) mode is activated, although the air conditioner 300 is not displayed on the display unit 151, the state information on the air conditioner 300 is output and the air conditioner 300 is controlled according to the user touch input.

Figure 15A:
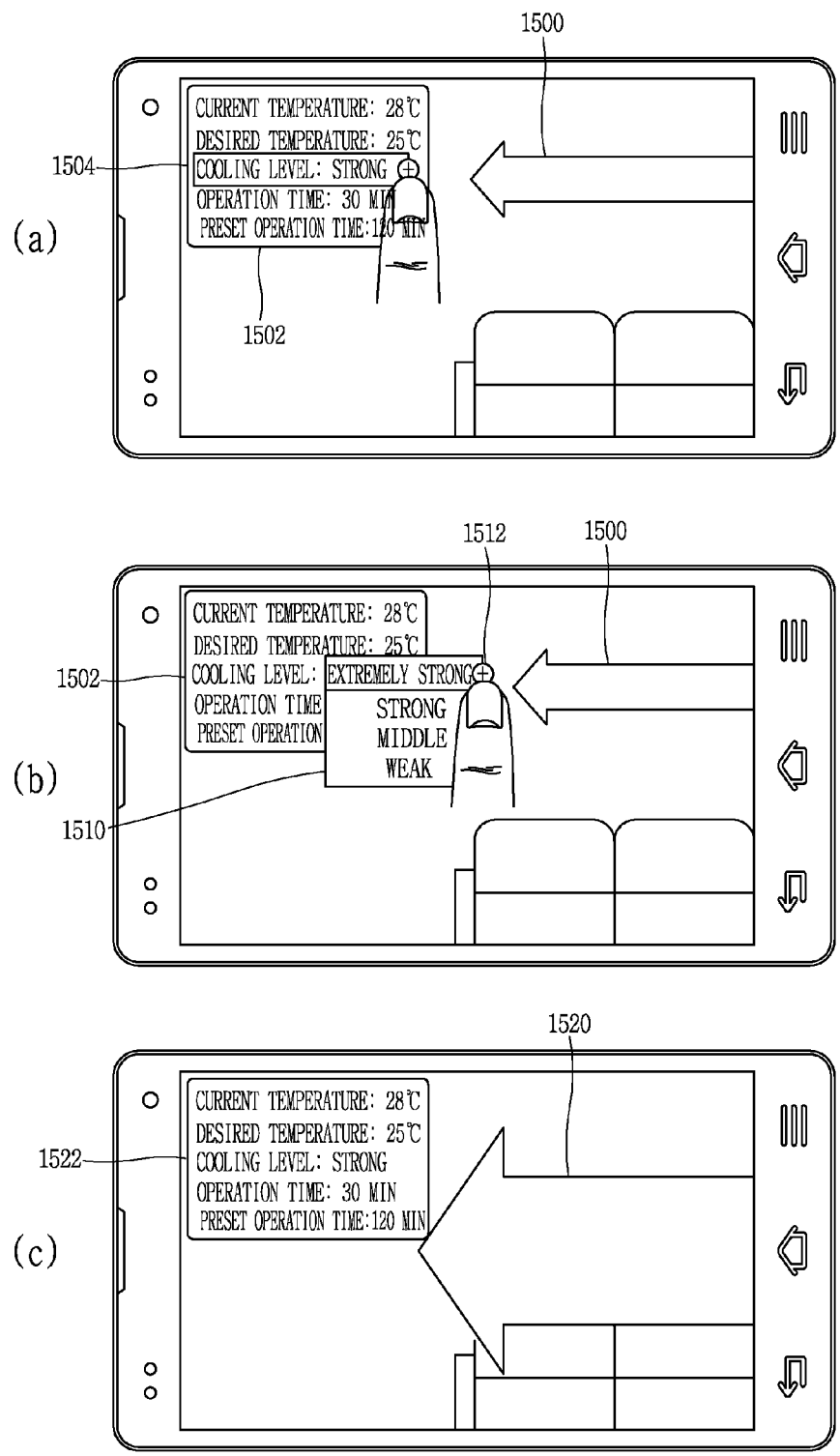
FIGS. 15A(a) to 15A(c) and 15B(a) to 15B(d) are diagrams for describing a method of controlling the operation state of the air conditioner although the air conditioner disappears from the viewing angle of the camera in the mobile terminal according to one embodiment of the present invention.

FIGS. 15a(a) to 15a(c) and 15b(a) to 15b(d) are diagrams for describing a method of controlling the operation state of the air conditioner although the air conditioner disappears from the viewing angle of the camera in the mobile terminal according to one embodiment of the present invention.

Referring to FIGS. 15a(a) to 15a(c), if the augmented reality (AR) mode is activated, even though the air conditioner 300 is out of the viewing angle, the state information on the air conditioner 300 is displayed. For example, even though the air conditioner 300 is out of the viewing angle of the camera, if the mobile terminal 100 is positioned within a given distance from the air conditioner 300 or within a given area, the state information on the air conditioner 300 is output to the display unit 151 through the augmented reality image. FIG. 15a(a) illustrates an example of this.

In this case, the controller 180 detects which one of the graphic objects 1500 and 1502 indicating the state information the user input is applied to. Then, if the user input is detected as being applied to the region on which one graphic object is displayed, the control signal corresponding to this detection is transmitted to the air conditioner 300.

For example, as illustrated in FIGS. 15a(a) to 15a(c), if a user input 1504 is detected as being applied to the region on which the graphic object 1502 indicating the operation state of the air conditioner 300 is displayed, the controller 180 recognizes that the operation state (for example, "cooling level: strong") of the air conditioner 300 corresponding to the user input 1504 is selected by the user.

In this case, the controller 180 outputs to at least one region of the display unit 151 the menu screen including at least one setting value that can be set to an operation state item selected by the user, corresponding to the user input. For example, as illustrated in FIG. 15a(b), the controller 180 outputs a menu screen 1510 including the multiple setting values for the operation state of the air conditioner 300 corresponding to the user input 1504, that is, for the cooling level.

Then, if the user selects one, among the setting values included in the menu screen 1510, the controller 180 transmits the control signal for controlling the air conditioner 300, based on the setting value corresponding to the user selection. That is, the controller 180 transmits to the air conditioner 300 the control signal for changing the operation state of the air conditioner 300 corresponding to the user input 1504 to the setting value (for example, "extremely strong") corresponding to the user selection.

Then, the cooling level is changed in the air conditioner 300 according to the control signal, and thus the state information on the air conditioner 300 that is displayed on the display unit 151 is changed. FIG. 15a(c) illustrates an example of this.

That is, as illustrated in FIG. 15a(c), even though the air conditioner 300 is not displayed on the display unit 151, a thickness of the arrow image indicating the force of the wind from the air conditioner 300 is changed according to the changed state information on the air conditioner 300. Then, the graphic object indicating the operation state of the air conditioner 300, as illustrated in FIG. 15a(c), displays the information on the changed operation state of the air conditioner 300.

In addition, of course, the controller 180 may transmit the control signal for changing the operation state and the drive state of the air conditioner 300 even through the user input of the touch and drag or the user input of the pinch-in and pinch-out touch gesture.

Figure 15B:
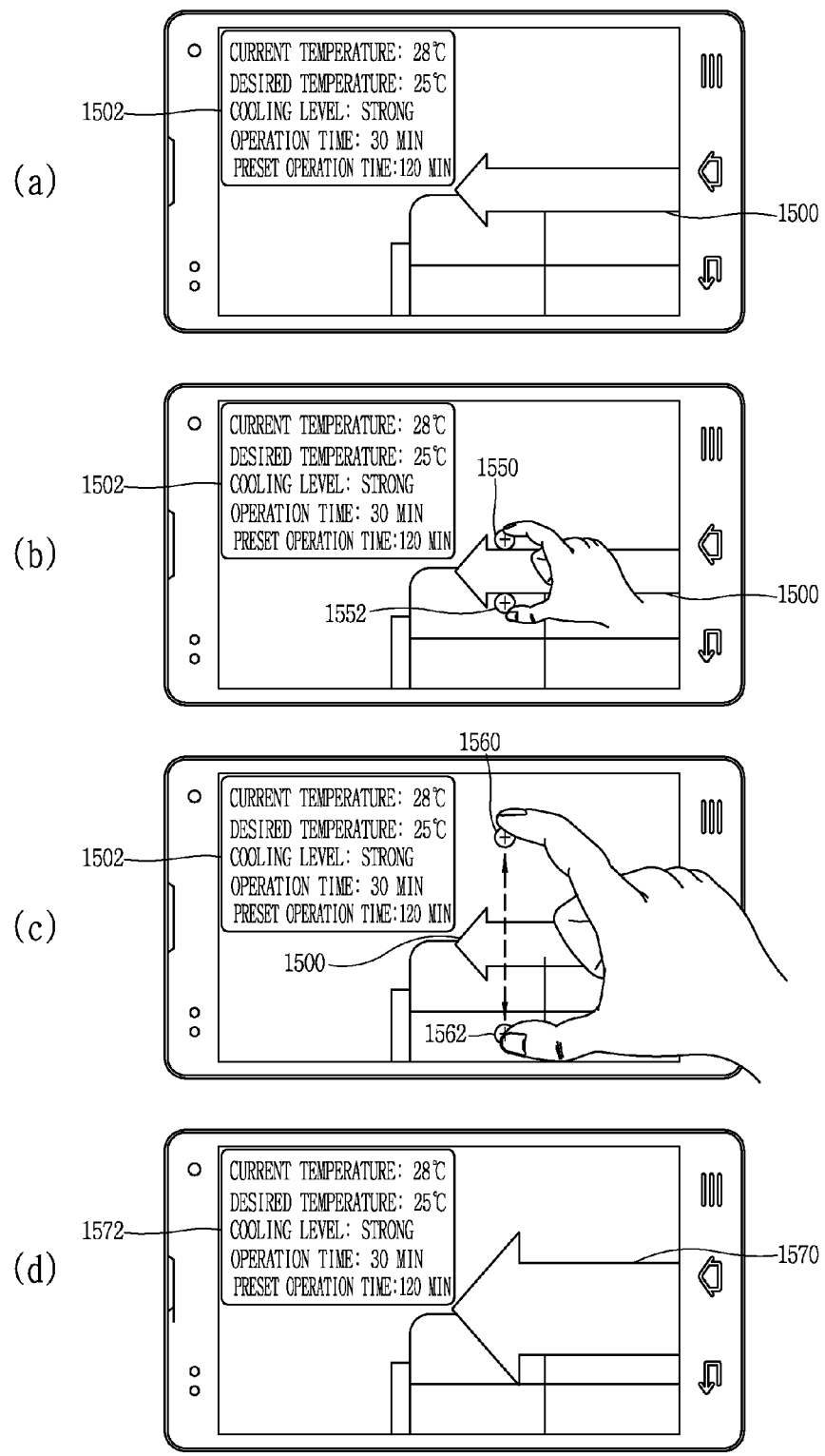

For example, as illustrated in FIG. 15b(a), even though the air conditioner 300 is out of the viewing angle of the camera, the state information on the air conditioner 30 is displayed on the display unit 151. In this state, the controller 180 detects whether the user input of the pinch-in or pin-out touch gesture is applied to the graphic object corresponding to the wind that is output from the air conditioner 300, that is, to the arrow image 1500.

Then, as illustrated in FIG. 15b(b), if user inputs 1550 and 1552 are detected as being applied to the region on which the arrow image 1500, the controller 180 recognizes that the user selects the control of the drive state of the air conditioner 300 corresponding to the arrow image 1500, that is, the wind that is output from the left lateral outlet grille of the air conditioner 300.

Then, as illustrated in FIG. 15b(c), if the user inputs 1560 and 1562 of the pinch-out gesture are detected as being applied, the controller 180 transmits to the air conditioner 300 the control signal for changing the force of the wind that is output from the left lateral outlet grille, to the force corresponding to the inputs 1560 and 1562 of the touch gesture.

Then, the air conditioner 300 changes the force of the wind that is output from the left lateral outlet grille, based on the received control signal. Accordingly, as illustrated in FIG. 15b(d), the thickness of the arrow image corresponding to the wind that is output from the left lateral outlet grille is changed to the thickness corresponding to the inputs 1560 and 1563 of the touch gesture. Then, a graphic object 1570 for indicating the operation state of the air conditioner 300 also indicates the information reflecting the changed operation state of the air conditioner 300.

In this manner, if the augmented reality (AR) mode is activated, even though the air conditioner 300 is not displayed on the screen, the mobile terminal 100 according to the embodiment of the present invention controls the air conditioner 300 without any limit using the state information on the air conditioner 300 that is displayed on the screen.

However, as described above, even though the state information on the air conditioner 300 is not displayed on the screen, a method of controlling the air conditioner 300 also is possible.

For example, if the augmented reality (AR) mode is activated, according to the user selection, the controller 180 outputs to the screen the map information indicating the current position of the air conditioner 300 or the guide information (for example, the arrow image indicating the direction in which the air conditioner 300 is positioned) indicating the direction in which the air conditioner 300 is positioned.

Then, if the touch input is detected as being applied to the region on which the map information or the guide information is displayed, the controller 180 displays the state information on the air conditioner 300 on the map information or the guide information. For example, the controller 180 displays the image indicating the directions or the forces of the winds that are output from the air conditioner 300, on the map information, along with the graphic object corresponding to the air conditioner 300. In addition, the controller 180 outputs to at least one region of the display unit 151 the current-state information on the air conditioner 300 in the form of a list, corresponding to the user touch input applied to the guide information.

Then, of course, if at least one image, among the images indicating the directions and the forces of the winds that are output from the air conditioner 300, respectively, or at least one list item, among list items including the state information on the air conditioner 300, is detected, the controller 180 may transmit the control signal corresponding to this detection to the air conditioner 300. Therefore, even though the air conditioner 300 is not displayed on the screen, the user can control the air conditioner 300 without any limit through the augmented reality image.

On the other hand, the embodiments of the present invention are described in detail above, but various modifications to the embodiments can be made without departing from the scope of the present invention. Specifically, according to the embodiments of the present invention, as an example of the home appliance that is controlled through the augmented reality image, the air conditioner is described above. However, of course, various home appliances, as well as the air conditioner, can be controlled.

For example, of course, instead of the air conditioner, the mobile terminal according to the embodiment of the present invention may control an automated vacuum cleaner through the augmented reality image. That is, if the automated vacuum cleaner is included within the viewing angle of the camera, the information on a current state of the automated vacuum cleaner is output, as the augmented reality image, to the display unit of the mobile terminal.

Furthermore, of course, the user can control the operation of the automated vacuum cleaner by touching on at least one region of the display unit 151 to which the augmented reality image is output. For example, of course, the user can assign to the automated vacuum cleaner a direction in which the automated vacuum cleaner moves for cleaning or an area that the automated vacuum cleaner cleans up, through the augmented reality image.

As described above, in the mobile terminal according to one embodiment of the present invention and the method of controlling the mobile terminal, the control signal corresponding to the user touch that is applied through the augmented reality image is transmitted to a specific home appliance, and this enables the user to control the specific home appliance through the augmented reality image.

In the mobile terminal according to one embodiment of the present invention and method of controlling the mobile terminal, the information on the corresponding home appliance is provided to the user through the augmented reality image, and this enables the user to check the corresponding home appliance for the drive state through the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a wireless communication unit configured to communicate with an air conditioner;
    a camera configured to capture an image of the air conditioner;
    a display unit configured to display the image of the air conditioner; and
    a controller configured to:
    receive state information of the air conditioner using the wireless communication unit,
    display, on the display unit, the state information of the air conditioner comprising operation information relating to a wind output from the air conditioner to a vicinity of the image of the air conditioner, and
    transmit a control signal for controlling the air conditioner to the air conditioner when a touch is applied to the state information,
    wherein the controller calculates a location of the mobile terminal relative to a location of the air conditioner, and the controller transmits to the air conditioner a control signal relating to the wind of the air conditioner according to the location of the mobile terminal relative to the location of the air conditioner.

2. The mobile terminal of claim 1, wherein the controller transmits to the air conditioner different control signals for controlling the air conditioner based on different types or strengths of touches that are applied to the region.

3. The mobile terminal of claim 2, wherein the state information comprises an image indicating information relating to a force of the wind output from the air conditioner,
    wherein if a pinch-in or pinch-out type touch is applied to the image indicating the operation information, the controller generates a control signal for controlling the force of the wind, and
    wherein an extent to which the force of the wind is controlled differs according to an extent to which the pinch-in or pinch-out type touch is applied to the image indicating the operation information.

4. The mobile terminal of claim 2, wherein based on at least one among a touch distance and direction of a drag touch applied to the state information, the controller transmits a control signal for changing a direction of the wind output from the air conditioner or changing a distance that the wind blows.

5. The mobile terminal of claim 1, wherein the location of the mobile terminal relative to the location of the air conditioner is calculated using at least one of a state of wireless communication between the air conditioner and the mobile terminal, an incident angle at which the air conditioner or the mobile terminal receives an image of its counterpart, a distance between the air conditioner and the mobile terminal, or a position of the mobile terminal with respect to the position of the air conditioner in an imaginary coordinate system.

6. The mobile terminal of claim 1, wherein the operation information comprises an image corresponding to the wind that is output from the air conditioner, and
    wherein the controller outputs the image corresponding to the wind to the vicinity of a region corresponding to a position of the wind output from the air conditioner.

7. The mobile terminal of claim 6, wherein the image corresponding to the wind output from the air conditioner is at least one of a stationary image or a dynamic image.

8. The mobile terminal of claim 7, wherein based on the operation information, the image corresponding to the wind output from the air conditioner is configured to take at least one of a specific shape, a specific appearance or a specific color.

9. The mobile terminal of claim 8, wherein the operation information comprises a direction of the wind, a force of the wind, a distance that the wind blows, and a temperature of the wind,
wherein the direction of the wind is indicated by an arrow image according to the direction of the wind, and
wherein the arrow image differs in thickness according to the force of the wind, the arrow image differs in length according to the distance that the wind blows, and the arrow image differs in color according to the temperature of the wind.

10. The mobile terminal according to claim 6, wherein the controller displays the state information other than the operation information on at least one region of the display unit through a text, an image, and a moving image.

11. The mobile terminal of claim 10, wherein the state information other than the operation information is displayed on a region of the image of the air conditioner, the region which corresponds to a region of the air conditioner where a display unit of the air conditioner is actually arranged.

12. The mobile terminal of claim 1, wherein based on a user selection, the controller controls the wireless communication unit so an optimal-state control signal for controlling at least one operation state of the air conditioner which enables the air conditioner to operate in an optimal state is transmitted.

13. The mobile terminal of claim 12, further comprising a storage unit storing an optimal-state setting information,
wherein the controller transmits to the air conditioner the optimal-state control signal that enables the air conditioner to operate in the optimal state.

14. The mobile terminal of claim 13, wherein if a current state information on the air conditioner is different from the optimal-state setting information stored in the storage unit, the controller outputs alarm information that notifies an availability of the optimal-state setting information.

15. The mobile terminal of claim 13, wherein the optimal-state setting information comprises at least one configuration value relating to a previous operation state of the air conditioner.

16. A mobile terminal comprising:
a wireless communication unit configured to communicate with an air conditioner;
a camera configured to capture an image of photographic subjects positioned within a range of a viewing angle, wherein the image includes one or more graphic objects corresponding to the photographic subjects;
a display unit configured to display the image of the photographic subjects; and
a controller configured to:
receive state information of the air conditioner using the wireless communication unit,
display, on the display unit, the state information of the air conditioner comprising operation information relating to a wind output from the air conditioner to a vicinity of the image of the one or more graphic objects when the wind output from the air conditioner reaches the photographic subject, wherein the photographic subject differs from the air conditioner, and
transmit a control signal for controlling the air conditioner to the air conditioner when a touch is applied to the state information,
wherein the controller calculates a location of the mobile terminal relative to a location of the air conditioner and the controller transmits to the air conditioner a control signal relating to the wind of the air conditioner according to the location of the mobile terminal relative to the location of the air conditioner.

17. The mobile terminal of claim 16, wherein the controller displays on at least one region of the display unit a graphic object that corresponds to the operation information relating to the wind output from the air conditioner.

18. The mobile terminal of claim 16, wherein the controller outputs the state information of the air conditioner comprising the operation information relating to the wind output on the vicinity of the image of the photographic subject in response to activation of an augmented reality (AR) mode.

19. A method of controlling a mobile terminal including a wireless communication unit configured to communicate with an air conditioner, the method comprising:
capturing, using a camera of the mobile terminal, an image of the air conditioner;
receiving state information of the air conditioner using the wireless communication unit;
displaying, on a display unit of the mobile terminal, state information of the air conditioner comprising operation information relating to a wind output from the air conditioner to a vicinity of the image of the air conditioner; and
transmitting a control signal for controlling the air conditioner to the air conditioner when a touch is applied to the state information,
wherein the method further comprises calculating a location of the mobile terminal relative to a location of the air conditioner, and transmitting to the air conditioner a control signal relating to the wind of the air conditioner according to the location of the mobile terminal relative to the location of the air conditioner.

20. The method of claim 19, wherein different control signals for controlling the air conditioner are transmitted to the air conditioner based on different types or strengths of touches applied to the state information.

21. The method of claim 20, wherein the state information comprises an image indicating information relating to a force of the wind output from the air conditioner,
wherein if a pinch-in or pinch-out type of touch is applied to the image indicating the operation information, the control signal for controlling the force of the wind is generated, and
wherein an extent to which the force of the wind is controlled differs according to an extent to which the pinch-in or pinch-out type of touch is applied to the image indicating the operation information.

22. The method of claim 19, wherein the operation information comprises an image corresponding to the wind output from the air conditioner, and
wherein the image is output to a vicinity of a region corresponding to a position of the wind outputted from the air conditioner.

23. The method of claim 19, wherein the control signal is an optimal-state control signal for controlling at least one operation state of the air conditioner which enables the air conditioner to operate in an optimal state.

24. A method of controlling a mobile terminal including a wireless communication unit configured to communicate with an air conditioner, the method comprising:

capturing, using a camera of the mobile terminal, an image of photographic subjects positioned within a range of a viewing angle, wherein the image includes one or more graphic objects corresponding to the photographic subjects;

displaying, on a display unit of the mobile terminal, the image of the photographic subjects;

receiving state information of the air conditioner using the wireless communication unit; and displaying, on the display unit, the state information of the air conditioner comprising operation information relating to a wind output from the air conditioner to a vicinity of the image of the one or more graphic objects when the wind output from the air conditioner reaches the photographic subject, wherein the photographic subject differs from the air conditioner; and transmitting a control signal for controlling the air conditioner to the air conditioner when a touch is applied to the state information, wherein the method further comprises calculating a location of the mobile terminal relative to a location of the air conditioner, and transmitting to the air conditioner a control signal relating to the wind of the air conditioner according to the location of the mobile terminal relative to the location of the air conditioner.

* * * * *